(12) United States Patent
Tatara et al.

(10) Patent No.: US 11,173,832 B2
(45) Date of Patent: Nov. 16, 2021

(54) VEHICULAR ILLUMINATION SYSTEM, VEHICULAR SYSTEM, VEHICLE, AND DATA COMMUNICATION SYSTEM

(71) Applicant: KOITO MANUFACTURING CO., LTD., Tokyo (JP)

(72) Inventors: Naoki Tatara, Shizuoka (JP); Takeshi Masuda, Shizuoka (JP); Toshihiro Okamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 210 days.

(21) Appl. No.: 16/468,990

(22) PCT Filed: Dec. 11, 2017

(86) PCT No.: PCT/JP2017/044357
§ 371 (c)(1),
(2) Date: Jun. 12, 2019

(87) PCT Pub. No.: WO2018/110495
PCT Pub. Date: Jun. 21, 2018

(65) Prior Publication Data
US 2019/0315271 A1    Oct. 17, 2019

(30) Foreign Application Priority Data

Dec. 13, 2016   (JP) .............................. JP2016-241090
Dec. 13, 2016   (JP) .............................. JP2016-241556

(51) Int. Cl.
*B60Q 1/54*       (2006.01)
*G05D 1/02*       (2020.01)

(52) U.S. Cl.
CPC .............. *B60Q 1/54* (2013.01); *G05D 1/0223* (2013.01); *G05D 1/0276* (2013.01); *G05D 2201/0213* (2013.01)

(58) Field of Classification Search
CPC .......... G05D 1/0223–0276; G05D 2201/0213; B60Q 1/54
See application file for complete search history.

(56) References Cited

U.S. PATENT DOCUMENTS

2015/0194053 A1    7/2015 Jensen
2015/0336502 A1   11/2015 Hillis et al.
(Continued)

FOREIGN PATENT DOCUMENTS

DE    102014226188 A1    6/2016
EP         2993083 A1    3/2016
(Continued)

OTHER PUBLICATIONS

International Search Report issued in Application No. PCT/JP2017/044357, dated Jan. 30, 2018 (10 pages).
(Continued)

*Primary Examiner* — Calvin Cheung
(74) *Attorney, Agent, or Firm* — Osha Bergman Watanabe & Burton LLP

(57) ABSTRACT

An illumination system includes an illumination control unit which is configured to change the illumination state of each of a left-side illumination unit (40L), a left-side auxiliary illumination unit (42L), a right-side illumination unit (40R), and a right-side auxiliary illumination unit (42R). The illumination control unit is configured to change the illumination state of the left-side illumination unit (40L) when a vehicle (1) has detected a pedestrian (P). The illumination control unit is configured to change the illumination state of the left-side auxiliary illumination unit (42L) according to the speed of the vehicle (1). The illumination control unit is configured to change the illumination state of each of light emission segments (43L) of the left-side illumination unit
(Continued)

(40L) and each of light emission segments (44L) of the left-side auxiliary illumination unit (42L).

17 Claims, 18 Drawing Sheets

(56) References Cited

U.S. PATENT DOCUMENTS

| | | |
|---|---|---|
| 2016/0179094 A1 | 6/2016 | Sorokin et al. |
| 2017/0088035 A1 | 3/2017 | Williams et al. |
| 2017/0088039 A1 | 3/2017 | Williams et al. |
| 2017/0088040 A1 | 3/2017 | Williams et al. |
| 2018/0093553 A1 | 4/2018 | Sorokin et al. |
| 2019/0225057 A1 | 7/2019 | Sorokin et al. |

FOREIGN PATENT DOCUMENTS

| | | |
|---|---|---|
| GB | 2531084 A | 4/2016 |
| JP | H09-277887 A | 10/1997 |
| JP | 2013-131065 A | 7/2013 |
| JP | 2015-71340 A | 4/2015 |
| JP | 2015-162005 A | 9/2015 |
| JP | 2016-124502 A | 7/2016 |
| JP | 2016-166013 A | 9/2016 |
| WO | 2006036920 A2 | 4/2006 |
| WO | 2017056995 A1 | 4/2017 |

OTHER PUBLICATIONS

Written Opinion issued in International Application No. PCT/JP2017/044357, dated Jan. 30, 2018 (7 pages).
Extended European Search Report issued in corresponding European Application No. 17881222.8; dated May 26, 2020 (8 pages).

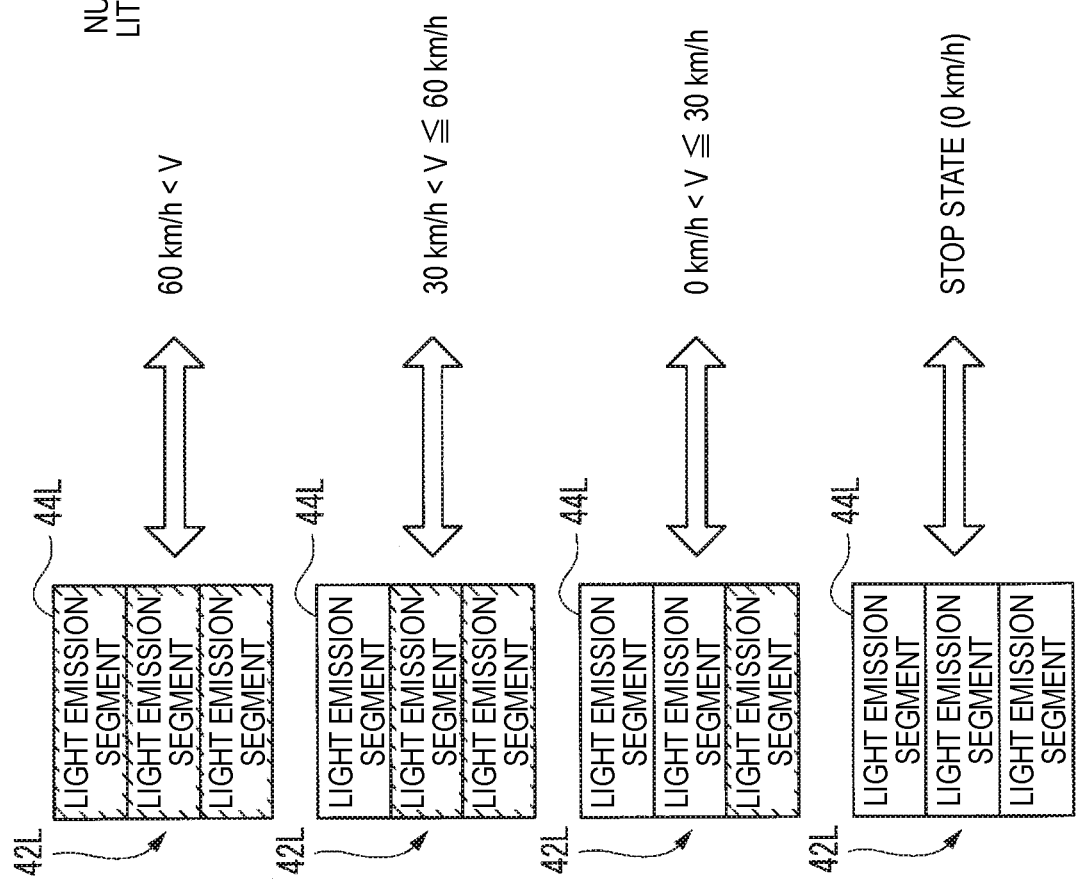

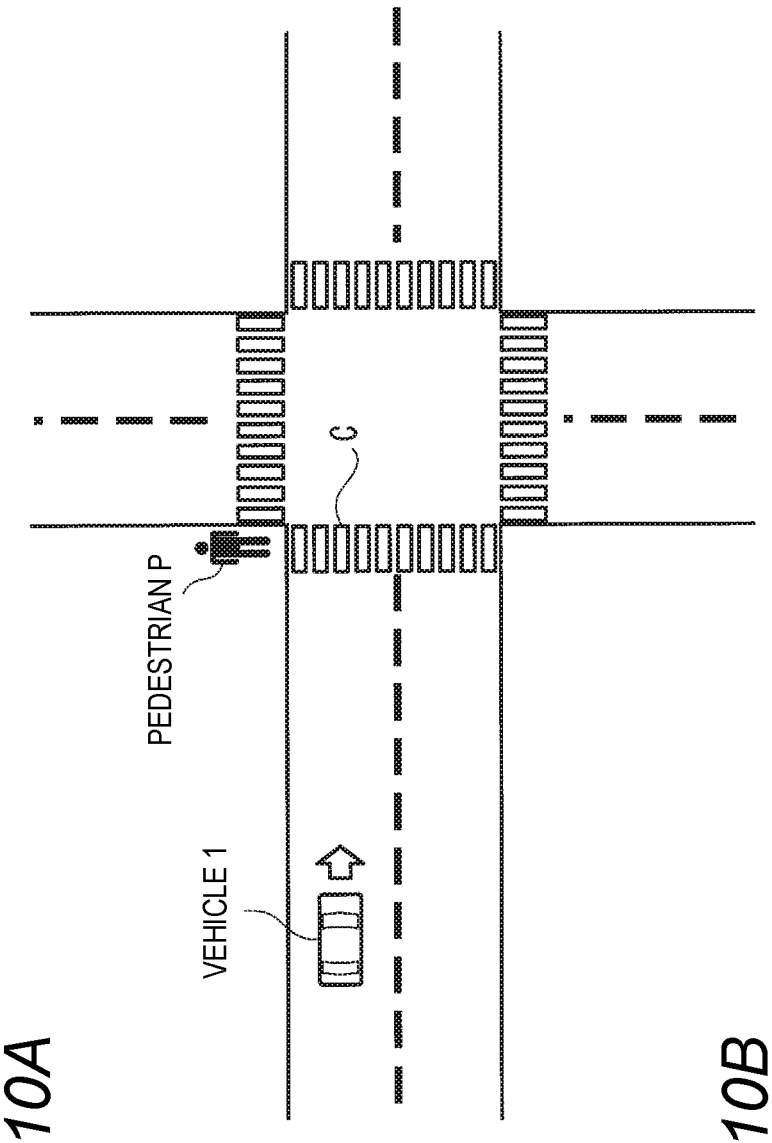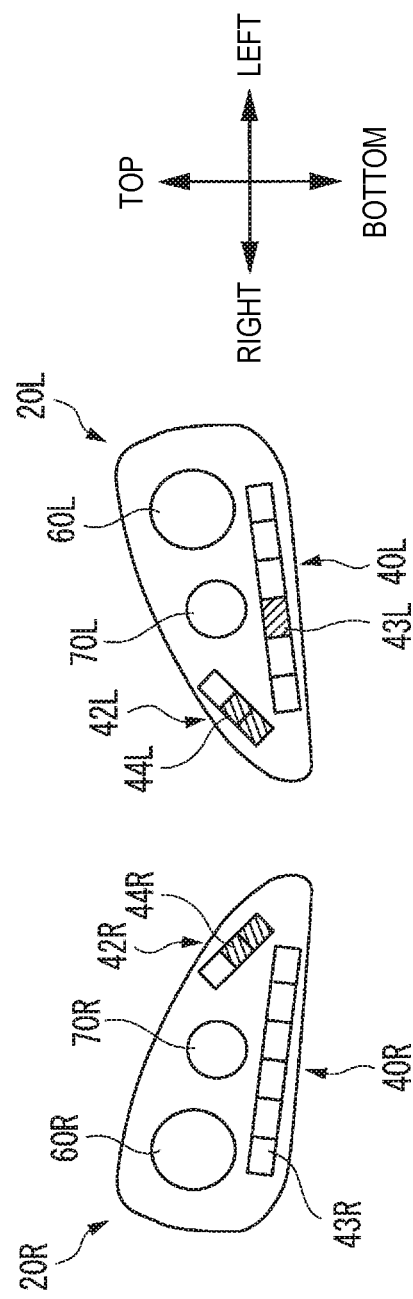
FIG. 10A
FIG. 10B

FIG. 12A
FIG. 12B
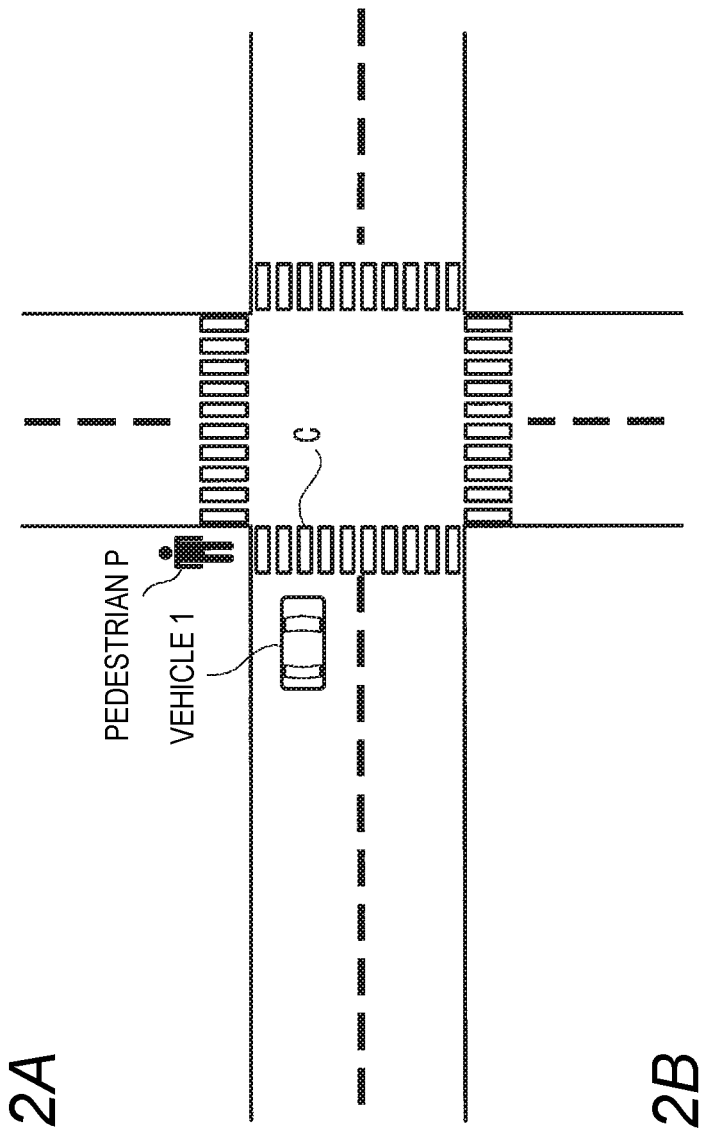
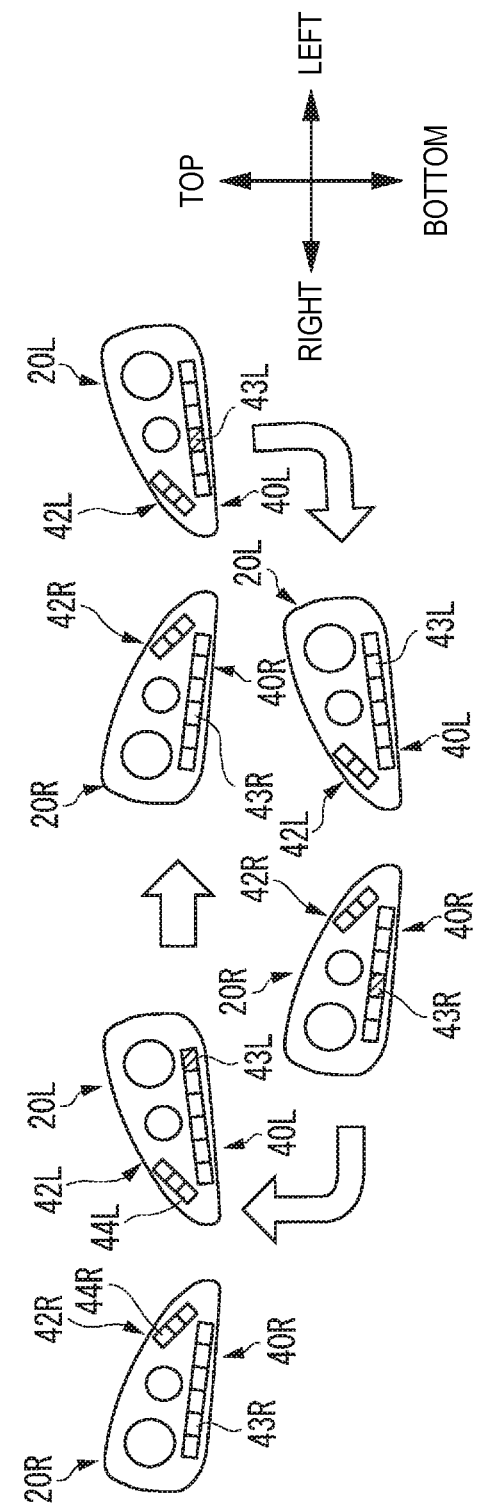

VEHICULAR ILLUMINATION SYSTEM, VEHICULAR SYSTEM, VEHICLE, AND DATA COMMUNICATION SYSTEM

TECHNICAL FIELD

The present disclosure relates to a vehicular illumination system. In particular, this disclosure relates to a vehicular illumination system that is installed in a vehicle capable of running in an autonomous drive mode. This disclosure also relates to a vehicular system that is equipped with a vehicular illumination system and a vehicle that is equipped with the vehicular system. This disclosure further relates to a data communication system including a vehicle.

BACKGROUND ART

At present, autonomous drive technologies of vehicles are being studied extensively in various countries and development of laws for allowing vehicles (in the following, the term "vehicle" means an automobile) to run on public roads in an autonomous drive mode are being made in various countries. In the autonomous drive mode, a vehicular system controls running of the vehicle automatically. More specifically, in the autonomous drive mode, the vehicular system automatically performs at least one of a steering control (a control of the running direction of the vehicle), a braking control and an acceleration control (a control of braking and acceleration/deceleration of the vehicle) on the basis of various kinds of information acquired by a camera, sensors, a radar, etc. On the other hand, in a manual drive mode (described below), as in many conventional vehicles, the driver controls running of a vehicle. More specifically, in the manual drive mode, running of a vehicle is controlled according to manipulations (steering manipulation, brake manipulation, accelerator manipulation) of the driver and a vehicle system does not perform a steering control, a braking control, or an acceleration control automatically. The vehicle drive mode is not a concept for particular kinds of vehicles but a concept for all vehicles including conventional vehicles not having an autonomous drive function, and is classified by a vehicle control method etc.

As is understood from the above, it is expected that in the future vehicles running in an autonomous drive mode (hereinafter referred to as "autonomous drive vehicles" where appropriate) and vehicles running in a manual drive mode (hereinafter referred to as "manual drive vehicles" where appropriate) will run on public roads in mixture. In particular, in a situation that many autonomous drive vehicles are running on a public road, it is preferable that each autonomous drive vehicle be able to show that it is aware of a pedestrian or the like.

For example, when there exists, ahead of an autonomous drive vehicle, a pedestrian who is going to cross a road using a pedestrian crossing, the pedestrian would feel anxious about the crossing unless he or she recognizes whether the autonomous drive vehicle is aware of him or her.

On the other hand, Patent document 1 discloses a cruise system that allows a following vehicle to follow a preceding vehicle automatically. In this cruise system, each of a preceding vehicle and a following vehicle is equipped with an illumination system, the illumination system of the preceding vehicle displays text information for preventing another vehicle from cutting in between a preceding vehicle and a following vehicle, and the following vehicle displays text information showing that it is doing a cruise drive.

CITATION LIST

Patent Document

Patent document 1: JP-A-9-277887

SUMMARY OF INVENTION

Technical Problem

Incidentally, in Patent document 1, no studies have been made of a vehicular illumination system or a vehicular system capable of presenting, to a target object such as a pedestrian or another vehicle, a vehicle running state and the fact that an autonomous drive vehicle is aware of the target object. Thus, a first object of this disclosure is to provide a vehicular illumination system capable of presenting, to a target object, a vehicle running state and the fact that a vehicle capable of running in an autonomous drive mode is aware of the target object.

Furthermore, in autonomous drive vehicles, it is effective to acquire various kinds of information by performing a communication between one vehicle and the other vehicle (Vehicle-to-Vehicle (V2V) communication), a communication between a vehicle and a traffic infrastructure facility (Vehicle-to-Infrastructure (V2I) communication), or a communication between a vehicle and a pedestrian (Vehicle-to-Pedestrian (V2P) communication). In general, since a V2V communication, a V2I communication, or a V2P communication is realized by a wireless communication, there is risk that data transmitted from a vehicle is intercepted by a third person. Thus, in the V2V communication, the V2I communication, or the V2P communication, increase in communication security need to be improved. A second object of the invention is therefore to provide a vehicle and a data communication system capable of increasing the communication security in a V2V communication, a V2I communication, or a V2P communication.

Means for Solving the Problem

A vehicular illumination system according to one aspect of the present disclosure is provided in a vehicle that is capable of running in an autonomous drive mode. The vehicular illumination system comprises:

an illumination unit which is configured to emit light toward an outside of the vehicle and disposed to be seen from a front side of the vehicle;

an auxiliary illumination unit which is configured to emit light toward the outside of the vehicle and disposed to be seen from the front side of the vehicle; and an illumination control unit which is configured to change an illumination state of each of the illumination unit and the auxiliary illumination unit.

The illumination control unit is configured to change the illumination state of the illumination unit when the vehicle has detected a target object.

The illumination control unit is configured to change the illumination state of the auxiliary illumination unit according to a speed of the vehicle.

The illumination unit comprises a plurality of first light emission segments.

The auxiliary illumination unit comprises a plurality of second light emission segments.

The illumination control unit is configured to change an illumination state of each of the first light emission segments and the second light emission segments.

In the above configuration, the illumination control unit is configured to change the illumination state of the illumination unit when the vehicle has detected a target object such as a pedestrian or another vehicle. The illumination control unit is configured to change the illumination state of the auxiliary illumination unit according to the speed of the vehicle. In this manner, the vehicular illumination system can be provided which can present, to the target object, together with a running state of the vehicle, the fact that the vehicle capable running on an autonomous drive mode is aware of the target object. The target object can recognize that the vehicle is aware of the target object by seeing the change of the illumination state of the illumination unit and can also recognize a running state (e.g., the speed of the vehicle is decreasing as it approaches the target object) of the vehicle by seeing a variation of the illumination state of the auxiliary illumination unit.

The illumination control unit may be configured to change the illumination state of the illumination unit according to a relative positional relationship between the vehicle and the target object.

In the above configuration, the illumination state of the illumination unit is changed according to the relative positional relationship between the vehicle and the target object. Since in this manner the target object can recognize that the vehicle approaching it is aware of it, it is possible to relieve the target object.

The illumination control unit may be configured to sequentially change the first light emission segment to be lit or turned off among the first light emission segments according to the relative positional relationship between the vehicle and the target object.

In the above configuration, the first light emission segment to be lit or turned off is sequentially changed according to the relative positional relationship between the vehicle and the target object. Since in this manner the target object can recognize that the vehicle approaching it is aware of it, it is possible to relieve the target object.

The illumination control unit may be configured to change the illumination state of the illumination unit when the vehicle has stopped after detecting the target object.

In the above configuration, the illumination state of the illumination unit is changed when the vehicle has detected the target object. Since in this manner a target object existing near a pedestrian crossing, for example, can recognize that the vehicle approaching it is aware of it by seeing the change of the illumination state of the illumination unit, the target object can cross the pedestrian crossing. As a result, the change of the illumination state of the illumination unit urges the target object to cross the pedestrian crossing.

The illumination control unit may be configured to sequentially change the first light emission segment to be lit or turned off among the plural first light emission segments in a movement direction of the target object when the vehicle has stopped after detecting the target object.

In the above configuration, when the vehicle has stopped after detecting the target object, the first light emission segment to be lit or turned off among the first light emission segments is sequentially changed in a movement direction of the target object. A target object existing near a pedestrian crossing, for example, can cross the road at ease using the pedestrian crossing because the pedestrian can recognize that the vehicle is aware of it by seeing that the first light emission segment to be lit or turned off among the plural first light emission segments is sequentially changed in its movement direction. As a result, the sequential changes of the illumination state of the illumination unit to be lit or turned off in the movement direction of the target object urge the target object to cross the road using the pedestrian crossing.

The illumination control unit may be configured to change the number of second light emission segments to be lit among the second light emission segments according to the speed of the vehicle.

In the above configuration, the number of second light emission segments to be lit among the plural second light emission segments is changed according to the speed of the vehicle. The target object can recognize that the vehicle is accelerating or decelerating by seeing the change of the number of lit second light emission segments. Thus, the target object can recognize a running state of the vehicle and hence can be relieved.

The illumination control unit may be configured to decrease the number of second light emission segments to be lit among the second light emission segments as the speed of the vehicle decreases.

In the above configuration, the number of second light emission segments to be lit among the plural second light emission segments is decreased as the speed of the vehicle decreases. The target object can recognize intuitively that the vehicle is decelerating by seeing that the number of lit second light emission segments decreases. For example, a target object existing near a pedestrian crossing can predict that the vehicle will stop short of the pedestrian crossing by recognizing decrease in the number of lit second light emission segments.

Each of the first light emission segments and the second light emission segments may comprise:
a first light emission element that is configured to emit light of a first color;
a second light emission element that is configured to emit light of a second color; and
a third light emission element that is configured to emit light of a third color.

The first color, the second color, and the third color may be different from each other. The illumination control unit may be configured to individually control lighting of the first light emission element, the second light emission element, and the third light emission element.

In the above configuration, since each of the plural light emission segments includes the three light sources which emit light beams of different colors, each of the illumination unit and the auxiliary illumination unit can produce various kinds of illumination patterns. In this manner, the amount of information of a communication between the vehicle and the target object can be increased.

The first light emission element may be configured to emit red light. The second light emission element may be configured to emit green light. The third light emission element may be configured to emit blue light.

In the above configuration, each of the plural first light emission segments and the plural second light emission segments can emit red light, green light, and blue light toward the outside. That is, having R, G, and B light sources, each of the plural first light emission segments and the plural second light emission segments can emit light beams of various colors. Since in this manner each of the illumination unit and the auxiliary illumination unit can produce various kinds of illumination patterns, the amount of information of a communication between the vehicle and the target object (V2P communication) can be increased.

A vehicular system according to one aspect of the present disclosure comprises:

a speed control unit which is configured to control a speed of a vehicle;

a detection unit which is configured to detect a target object;

a position information acquiring unit which is configured to acquire position information of the target object; and the vehicular illumination system.

The above configuration makes it possible to provide a vehicular system capable of presenting, to the target object, a vehicle running state and the fact that the vehicle capable of running in an autonomous drive mode is aware of the target object.

A vehicle according to one aspect of the present disclosure comprises the vehicular system and is capable of running in an autonomous drive mode.

The above configuration allows the vehicle that is capable of running in an autonomous drive mode to present, to the target object, a running state of the vehicle and the fact that the vehicle is aware of the target object.

A vehicle according to one aspect of the present disclosure is capable of running in an autonomous drive mode, and comprises:

a data generation unit which is configured to generate data;

a first password generation unit which is configured to generate a password to be used for encrypting the data;

an encryption unit which is configured to generate encrypted data by encrypting the data using the password;

an illumination control signal generation unit which is configured to generate an illumination control signal based on the password;

a first wireless communication unit which is configured to transmit the encrypted data wirelessly;

an illumination unit which is configured to emit light toward an outside of the vehicle and comprises a plurality of light emission segments; and an illumination control unit which is configured to set an illumination pattern of the illumination unit based on the illumination control signal.

In this configuration, an illumination control signal is generated based on a password of encrypted data to be transmitted wirelessly and an illumination pattern of the illumination unit is set based on the illumination control signal. On the other hand, a data communication device (e.g., another vehicle) other than the self vehicle can generate the password of the encrypted data from the illumination pattern of the illumination unit. The communication security of a V2V communication, a V2I communication, or a V2P communication can be increased using the illumination pattern of the illumination unit in this manner.

The illumination control unit may be configured to set an illumination color of each of the light emission segments based on the illumination control signal.

In this configuration, the illumination color of each of the plural light emission segments is set based on the illumination control signal. On the other hand, a data communication device (e.g., another vehicle) other than the self vehicle can generate the password of the encrypted data from illumination colors of the plural respective light emission segments. The communication security of a V2V communication, a V2I communication, or a V2P communication can be increased using illumination colors of the plural respective light emission segments in this manner.

Each of the light emission segments may comprise:

a first light emission element that is configured to emit light of a first color;

a second light emission element that is configured to emit light of a second color; and a third light emission element that is configured to emit light of a third color.

The first color, the second color, and the third color may be different from each other. The illumination control unit may be configured to individually control lighting of the first light emission element, the second light emission element, and the third light emission element.

In this configuration, since each of the plural light emission segments includes three light sources that emit light beams of different colors, the illumination unit can produce various kinds of illumination patterns. Since the information amount of a password of encrypted data can be increased in this manner, the communication security of a V2V communication, a V2I communication, or a V2P communication can be increased.

The first light emission element may be configured to emit red light.

The second light emission element may be configured to emit green light.

The third light emission element may be configured to emit blue light.

In this configuration, each of the plural light emission segments can emit red light, green light, and blue light toward the outside. That is, having R, G, and B light sources, each of the plural light emission segments can emit light beams of various colors. Since the information amount of a password of encrypted data can be increased in this manner, the communication security of a V2V communication, a V2I communication, or a V2P communication can be increased.

A data communication device according to one aspect of the present disclosure comprises:

a second wireless communication unit which is configured to receive encrypted data wirelessly;

an imaging unit which is configured to acquire a shot image by shooting an image of an illumination pattern formed by an illumination unit of another vehicle;

a second password generation unit which generates a password based on the acquired shot image; and a decryption unit which is configured to decrypt the encrypted data using the generated password.

In this configuration, a password is generated based on a shot image of an illumination pattern and encrypted data transmitted wirelessly is decrypted using the thus-generated password. The communication security of a V2V communication, a V2I communication, or a V2P communication can be increased using the illumination pattern of the illumination unit of the other vehicle in this manner.

In the V2V communication, the data communication device corresponds to another vehicle that is capable of running in autonomous drive mode, for example. In the V2I communication, the data communication device corresponds to traffic infrastructure facility (e.g., traffic lights installed at an intersection or a toll gate installed for an express way), for example. In the V2P communication, the data communication device corresponds to a portable electronic device carried by a pedestrian (e.g., smartphone or tablet terminal), for example.

A data communication system according to one aspect of the present disclosure, comprises:

a vehicle that is capable of running in an autonomous drive mode; and a data communication device.

The vehicle comprises:

a data generation unit which is configured to generate data;

a first password generation unit which is configured to generate a password to be used for encrypting the data;

an encryption unit which is configured to generate encrypted data by encrypting the data using the password;

an illumination control signal generation unit which is configured to generate an illumination control signal based on the password;

a first wireless communication unit which is configured to transmit the encrypted data wirelessly;

an illumination unit which is configured to emit light toward an outside of the vehicle and comprises a plurality of light emission segments; and an illumination control unit which is configured to set an illumination pattern of the illumination unit based on the illumination control signal; and The data communication device comprises:

a second wireless communication unit which is configured to receive the encrypted data wirelessly;

an imaging unit which is configured to acquire a shot image by shooting an image of the illumination pattern formed by the illumination unit of the vehicle;

a second password generation unit which generates the password based on the acquired shot image; and a decryption unit which is configured to decrypt the encrypted data using the generated password.

In this configuration, an illumination control signal is generated based on a password of encrypted data to be transmitted wirelessly and an illumination pattern of the illumination unit is set based on the illumination control signal. On the other hand, the data communication device (e.g., another vehicle) other than the self vehicle shoots an image of the illumination pattern of the illumination unit and generates the password of the encrypted data based on a shot image of the illumination pattern. The encrypted data transmitted wirelessly is decrypted using the thus-generated password. The communication security of a V2V communication, a V2I communication, or a V2P communication can be increased using the illumination pattern of the illumination unit in this manner.

A vehicle according to one aspect of the present disclosure is capable of running in an autonomous drive mode.

The vehicle comprises:

a data generation unit which is configured to generate data;

an illumination control signal generation unit which is configured to generate an illumination control signal based on the data;

an illumination unit which is configured to emit light toward an outside of the vehicle and comprises a plurality of light emission segments; and an illumination control unit which is configured to set an illumination pattern of the illumination unit based on the illumination control signal.

In this configuration, an illumination control signal is generated based on generated data and an illumination pattern of the illumination unit is set based on the illumination control signal. On the other hand, a data communication device (e.g., another vehicle) other than the self vehicle can generate the data from the illumination pattern of the illumination unit. The communication security of a V2V communication, a V2I communication, or a V2P communication can be increased using the illumination pattern of the illumination unit in this manner.

BRIEF DESCRIPTION OF DRAWINGS

FIG. 8A is a rough diagram showing how the illumination state of the left-side auxiliary illumination unit is changed according to the speed V of the vehicle.

FIG. 8B is a graph showing a relationship between the speed V of the vehicle and the number N of lit segments.

FIG. 10A is a diagram showing a situation involving the pedestrian existing near the pedestrian crossing and the vehicle that is approaching the intersection.

FIG. 10B shows illumination states of the left-side headlamp and the right-side headlamp in the situation shown in FIG. 10A.

FIG. 12A is a diagram showing a situation involving the pedestrian existing near the pedestrian crossing and the vehicle that has stopped short of the intersection.

FIG. 12B shows illumination states of the left-side headlamp and the right-side headlamp in the situation shown in FIG. 12A.

DESCRIPTION OF EMBODIMENTS

Embodiment 1

Figure 1:
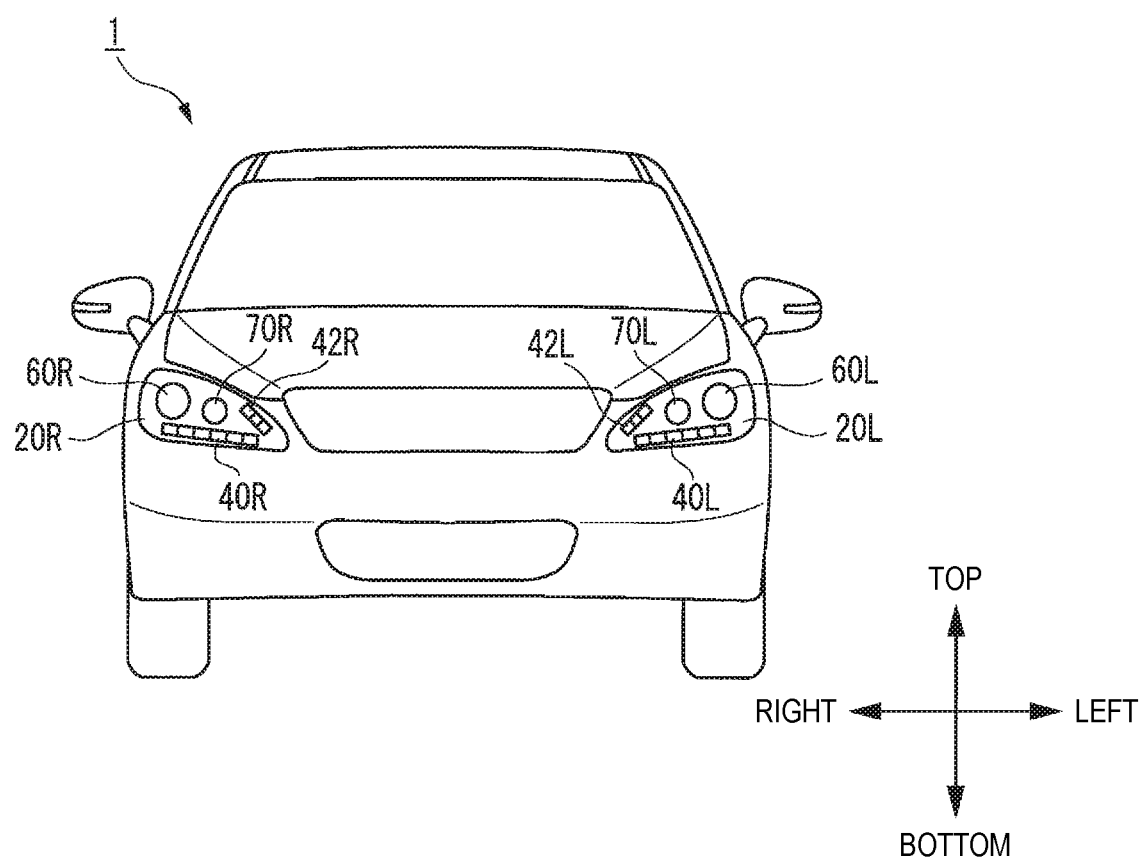
FIG. 1 is a front view of a vehicle which is equipped with a vehicular illumination system according to a first embodiment of the present invention.

A first embodiment of the present invention (hereinafter referred to as a first embodiment) will be described below with reference to the drawings. For convenience of description, descriptions of members having the same reference numerals as members already described in the embodiment may be omitted. For convenience of description, the dimensions of each member shown in the drawings may be different from actual dimensions of the member.

In the description of this embodiment, for convenience of description, reference will be made to the "left-right direction," "front-rear direction," and "top-bottom direction" when necessary. These directions are relative directions that are set for a vehicle 1 shown in FIG. 1. The "top-bottom direction" is a direction including a "top direction" and a bottom direction." The "front-rear direction" is a direction including a "front direction" and a rear direction." The "left-right direction" is a direction including a "left direction" and a right direction."

Figure 2:
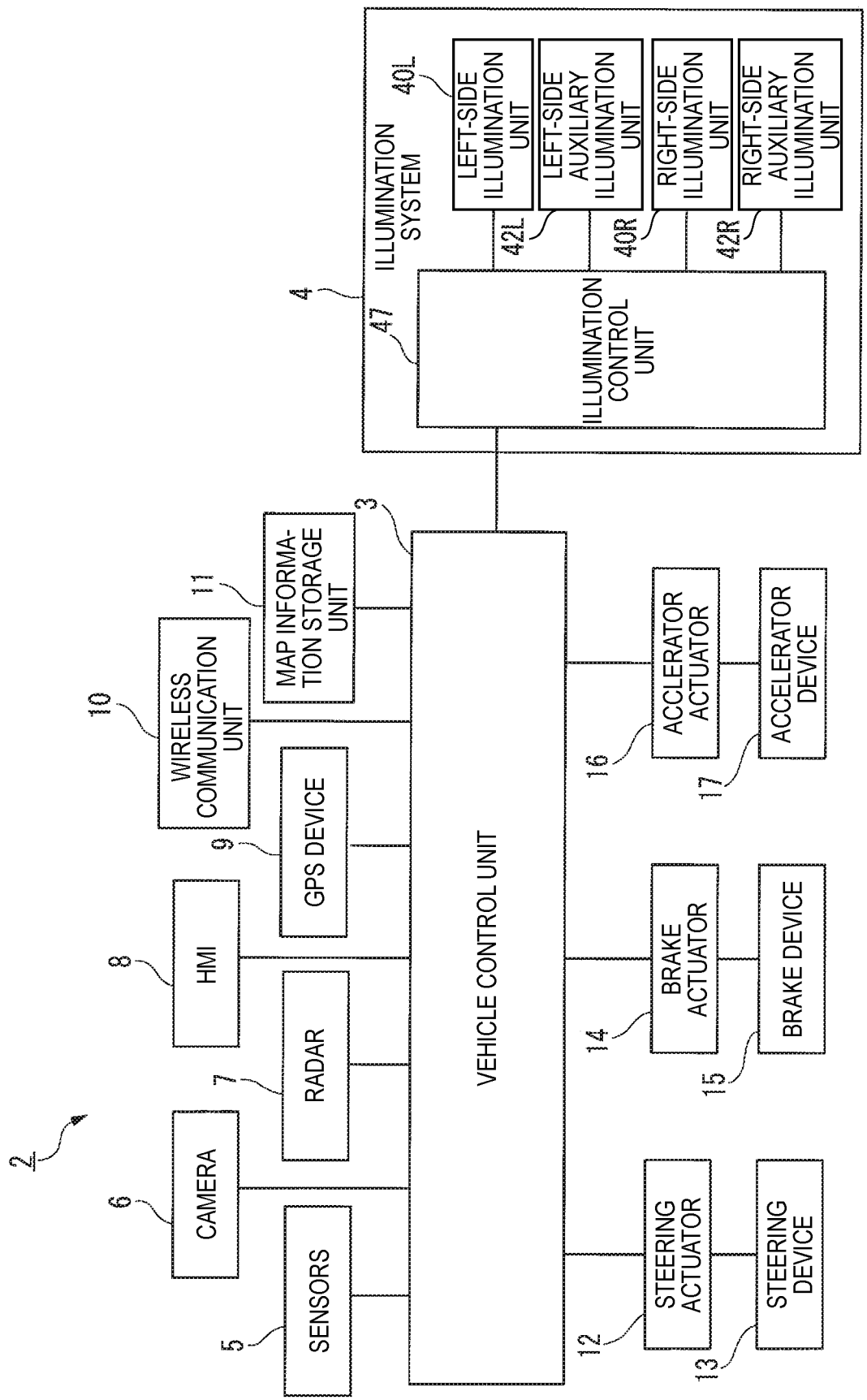
FIG. 2 is a block diagram of a vehicular system which is equipped with the vehicular illumination system according to the first embodiment.

First, a vehicular illumination system 4 according to this embodiment (hereinafter referred to simply as a "vehicular illumination system 4") will be described below with reference to FIGS. 1 and 2. FIG. 1 is a front view of a vehicle 1. FIG. 2 is a block diagram of a vehicular system 2 which is equipped with the illumination system 4. The vehicle 1 is a vehicle (automobile) capable of running in an autonomous drive mode and is equipped with the illumination system 4 (see FIG. 2). The illumination system 4 is equipped with a left-side illumination unit 40L, a left-side auxiliary illumination unit 42L, a right-side illumination unit 40R, a right-side auxiliary illumination unit 42R, and an illumination control unit 47. Each of the left-side illumination unit 40L, the left-side auxiliary illumination unit 42L, the right-side illumination unit 40R, and the right-side auxiliary illumination unit 42R is a lamp for assisting a communication between a target object such as a pedestrian or another vehicle and the vehicle 1 (e.g., V2P communication or V2V communication).

The left-side illumination unit 40L and the left-side auxiliary illumination unit 42L are configured so as to emit light toward the outside of the vehicle 1 and are disposed in a lamp room of left-side headlamp 20L disposed at a front-left position of the vehicle 1 so that they can be seen from the front side of the vehicle 1. The lamp room of left-side headlamp 20L is formed by a lamp housing (not shown) and a transparent cover (not shown) that is connected to the lamp housing. "To emit light toward the outside of the vehicle 1" means that light emitted from the left-side illumination unit 40L or the left-side auxiliary illumination unit 42L can be seen by a pedestrian or the like existing outside the vehicle 1 and does not necessarily mean that the left-side illumination unit 40L or the left-side auxiliary illumination unit 42L emits light directly toward a pedestrian or the like existing outside the vehicle 1. The left-side illumination unit 40L is disposed so as to extend in the left-right direction of the vehicle 1. The left-side auxiliary illumination unit 42L is disposed so as to extend in a direction that is inclined by a prescribed angle (e.g., acute angle) with respect to the arrangement direction of the left-side illumination unit 40L (left-right direction). The left-side headlamp 20L has a low-beam lamp 60L which is configured so as to emit a low beam toward the front side of the vehicle 1 and a high-beam lamp 70L which is configured so as to emit a high beam toward the front side of the vehicle 1.

The right-side illumination unit 40R and the right-side auxiliary illumination unit 42R are configured so as to emit light toward the outside of the vehicle 1 and are disposed in a lamp room of right-side headlamp 20R disposed at a front-right position of the vehicle 1 so that they can be seen from the front side of the vehicle 1. "To emit light toward the outside of the vehicle 1" means that light emitted from right-side illumination unit 40R or the right-side auxiliary illumination unit 42R can be seen by a pedestrian or the like existing outside the vehicle 1 and does not necessarily mean that the right-side illumination unit 40R or the right-side auxiliary illumination unit 42R emits light directly toward a pedestrian or the like existing outside the vehicle 1. The right-side illumination unit 40R is disposed so as to extend in the left-right direction of the vehicle 1. The right-side auxiliary illumination unit 42R is disposed so as to extend in a direction that is inclined by a prescribed angle (e.g., acute angle) with respect to the arrangement direction of the right-side illumination unit 40R (left-right direction). The right-side headlamp 20R has a low-beam lamp 60R which is configured so as to emit a low beam toward the front side of the vehicle 1 and a high-beam lamp 70R which is configured so as to emit a high beam toward the front side of the vehicle 1.

There are no particular limitations on the installation position of the left-side illumination unit 40L and the left-side auxiliary illumination unit 42L except that they can be seen from the front side of the vehicle 1. Likewise, there are no particular limitations on the installation position of the right-side illumination unit 40R and the right-side auxiliary illumination unit 42R except that they can be seen from the front side of the vehicle 1.

Next, the vehicular system 2 of the vehicle 1 will be described with reference to FIG. 2. As shown in FIG. 2, the vehicular system 2 is equipped with a vehicle control unit 3, the illumination system 4, sensors 5, a camera 6, a radar 7, an HMI (human machine interface) 8, a GPS (global positioning system) device 9, a wireless communication unit 10, and a map information storage unit 11. The vehicular system 2 is further equipped with a steering actuator 12, a steering device 13, a brake actuator 14, a brake device 15, an accelerator actuator 16, and an accelerator device 17.

The vehicle control unit 3 is configured so as to control running of the vehicle 1. For example, the vehicle control unit 3 is configured by one electronic control unit (ECU), which includes a computing system (e.g., microcontroller) including one or more processors and one or more memories and an electronic circuit consisting of active elements such as transistors and passive elements. For example, the processor(s) is a CPU (central processing unit), an MPU (microprocessing unit), a GPU (graphics processing unit), and/or a TPU (tensor processing unit). The CPU may consist of plural CPU cores. The GPU may consist of plural GPU cores. The memory or memories include a ROM (read-only memory) and a RAM (random access memory). The ROM may be stored with vehicle control programs, which may include, for example, an artificial intelligence (AI) program for autonomous driving. The AI program is a program that was constructed by machine learning with or without a teacher using a neural network, such as deep learning. The RAM may be temporarily stored with the vehicle control programs, vehicle control data, and/or surrounding environment information indicating an environment surrounding the vehicle. The processor(s) may be configured so as to develop, on the RAM, a designated program among the various vehicle control programs stored in the ROM and perform any of various kinds of processing cooperating with the RAM. The computer system may be configured by an ASIC (application-specific integrated circuit), an FPGA (field-programmable gate array), or the like.

As described above, the illumination system 4 is equipped with the illumination control unit 47, the left-side illumination unit 40L, the left-side auxiliary illumination unit 42L, the right-side illumination unit 40R, and the right-side auxiliary illumination unit 42R. The illumination control unit 47 is configured so as to change the illumination state (illumination color, illumination intensity, blinking cycle, illumination location, illumination area, etc.) of each of the left-side illumination unit 40L and the right-side illumination unit 40R. Furthermore, the illumination control unit 47 is configured so as to change the illumination state (illumination color, illumination intensity, blinking cycle, illumination location, illumination area, etc.) of each of the left-side auxiliary illumination unit 42L and the right-side auxiliary illumination unit 42R.

The illumination control unit 47 is configured by an electronic control unit (ECU) and electrically connected to a power source (not shown). The electronic control unit includes a computing system (e.g., microcontroller) including one or more processors and one or more memories and an electronic circuit (e.g., drive circuits such as LED drivers) consisting of active elements such as transistors and passive elements. For example, the processor(s) is a CPU, MPU, GPU, and/or a TPU. The memory or memories include a ROM and a RAM. The computer system may be configured by an ASIC, an FPGA, or the like. Although in this embodiment the vehicle control unit 3 and the illumination control unit 47 are separate units, they may be implemented as a single unit, that is, a single electronic control unit. The configurations of the left-side illumination unit 40L and the right-side illumination unit 40R will be described later.

The sensors 5 are an acceleration sensor, a speed sensor, a gyro sensor, etc. The sensors 5 are configured so as to detect a running state of the vehicle 1 and output running state information indicating the running state of the vehicle 1 to the vehicle control unit 3. For example, the speed sensor is configured so as to detect a speed of the vehicle 1 and output speed information indicating the speed of the vehicle 1 to the vehicle control unit 3. The sensors 5 may also include a sitting sensor for detecting whether the driver is sitting in the driver's seat, a face direction sensor for detecting a face direction of the driver, an external weather sensor for detecting an external weather state, and a human sensor for detecting whether a person(s) exists in the vehicle, etc.

The camera 6 is a camera incorporating an imaging device such as a CCD (charge-coupled device), a CMOS (complementary MOS) sensor, or the like. The radar 7 is a millimeter wave radar, a microwave radar, a laser radar, or the like. The camera 6 and/or the radar 7 is configured so as to detect a surrounding environment (another vehicle, pedestrian, road shape, traffic sign, obstacle, etc.) and output surrounding environment to the vehicle control unit 3.

The HMI 8 consists of input units for receiving an input manipulation of the driver and output units for outputting running state information etc. to the driver. The input units include a steering wheel, an accelerator pedal, a brake pedal, a drive mode switch for switching the drive mode of the vehicle 1, etc. The output units include, among other things, a display that is configured so as to display running state information, surrounding environment information, illumination states of the illumination system 4.

The GPS device 9 is configured so as to acquire current position information of the vehicle 1 and output the acquired current position information to the vehicle control unit 3. The wireless communication unit 10 is configured so as to receive, from another vehicle existing around the vehicle 1, information relating to the other vehicle (e.g., another vehicle running information) and transmit information relating to the vehicle 1 (e.g., self vehicle running information) to the other vehicle (V2V communication).

The wireless communication unit 10 is configured so as to receive infrastructure information from an infrastructure facility such as traffic lights or a beacon and transmit self vehicle running information of the vehicle 1 to the infrastructure facility (V2I communication). Furthermore, the wireless communication unit 10 is configured so as to receive information relating to a pedestrian from a portable electronic device (smartphone, tablet terminal, wearable device, or the like) carried by the pedestrian and transmit self vehicle running information of the vehicle 1 to the portable electronic device (V2P communication). The vehicle 1 may communicate with another vehicle, an infrastructure facility, or a portable electronic device either directly in an ad hoc mode or via an access point. The vehicle 1 may further communicate with another vehicle, an infrastructure facility, or a portable electronic device over a communication network such as the Internet (not shown). For example, the wireless communication standard is Wi-Fi (registered trademark), Bluetooth (registered trademark), ZigBee (registered trademark), LPWA, DSRC (registered trademark), or Li-Fi. The vehicle 1 may communicate with another vehicle, an infrastructure facility, or a portable electronic device using a fifth generation mobile communication system (5G). The map information storage unit 11 is an external storage device such as a hard disk drive which is stored with map information and is configured so as to output map information to the vehicle control unit 3. The map information may be updated every time a prescribed period elapses.

While the vehicle 1 is running in the autonomous drive mode, the vehicle control unit 3 automatically generates at least one of a steering control signal, an acceleration control signal, and a braking control signal on the basis of running state information, surrounding environment information, current position information, map information, etc. The steering actuator 12 is configured so as to receive a steering control signal from the vehicle control unit 3 and control the steering device 13 on the basis of the received steering control signal. The braking actuator 14 is configured so as to receive a braking control signal from the vehicle control unit 3 and control the brake device 13 on the basis of the received braking control signal. The accelerator actuator 16 is configured so as to receive an acceleration control signal from the vehicle control unit 3 and control the accelerator device 17 on the basis of the received acceleration control signal. In these manners, in the autonomous drive mode, running of the vehicle 1 is controlled automatically by the vehicular system 2. The vehicle control unit 3 functions as a speed control unit for controlling the speed of the vehicle 1 by transmitting an acceleration control signal to the accelerator actuator 16.

On the other hand, while the vehicle 1 is running in the manual drive mode, the vehicle control unit 3 generates a steering control signal, an acceleration control signal, and a braking control signal according to manual manipulations of the driver on the accelerator pedal, the brake pedal, and the steering wheel. In the manual drive mode, since in this manner a steering control signal, an acceleration control signal, and a braking control signal are generated according to manual manipulations of the driver, running of the vehicle 1 is controlled by the driver.

Next, drive modes of the vehicle 1 will be described. The drive modes are the autonomous drive mode and the manual drive mode. The autonomous drive mode consists of a complete autonomous drive mode, a high-level drive assist mode, and a drive assist mode. In the complete autonomous drive mode, the vehicular system 2 automatically performs all the running controls, that is, the steering control, the braking control, and the acceleration control, and the driver is not in such a state as to be able to drive the vehicle 1. In the high-level drive assist mode, the vehicular system 2 automatically performs all the running controls, that is, the steering control, the braking control, and the acceleration control, and the driver is in such a state as to be able to drive the vehicle 1 but does not drive the vehicle 1. In the drive assist mode, the vehicular system 2 automatically performs part of the running controls, that is, part of the steering control, the braking control, and the acceleration control, and the driver drives the vehicle 1 under drive assistance of the vehicular system 2. On the other hand, in the manual drive mode, the vehicular system 2 does not perform any of the running controls automatically and the driver drives the vehicle 1 without drive assistance of the vehicular system 2.

The drive mode of the vehicle 1 may be switched by manipulating the drive mode switch. In this case, the vehicle control unit 3 switches between the four drive modes (complete autonomous drive mode, high-level drive assist mode, drive assist mode, and manual drive mode) according to a manipulation of the driver on the drive mode switch. The drive mode of the vehicle 1 may be switched automatically on the basis of information about a zone in which running of an autonomous drive vehicle is permitted or a zone in which running of an autonomous drive vehicle is prohibited and information about an external weather state. In this case, the vehicle control unit 3 switches the drive mode of the vehicle 1 on the basis of those kinds of information. Furthermore, the vehicle control unit 3 may switch the drive mode of the vehicle 1 on the basis of output signals of the seating sensor and the face direction sensor. In this case, the vehicle control unit 3 may switch the drive mode of the vehicle 1 on the basis of output signals of the seating sensor and the face direction sensor.

Figure 3:
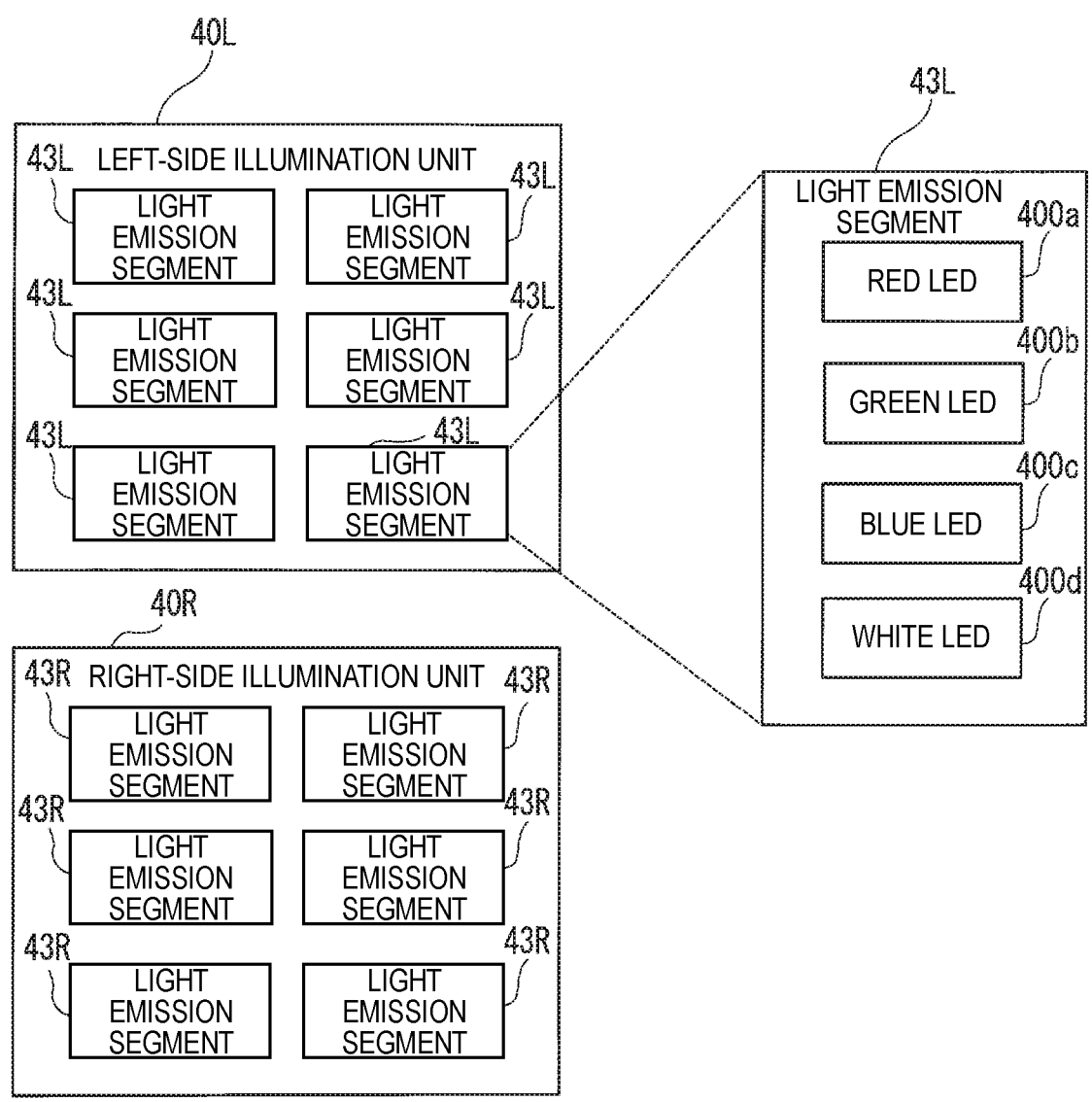
FIG. 3 is a block diagram of a left-side illumination unit and a right-side illumination unit.
Figure 4:
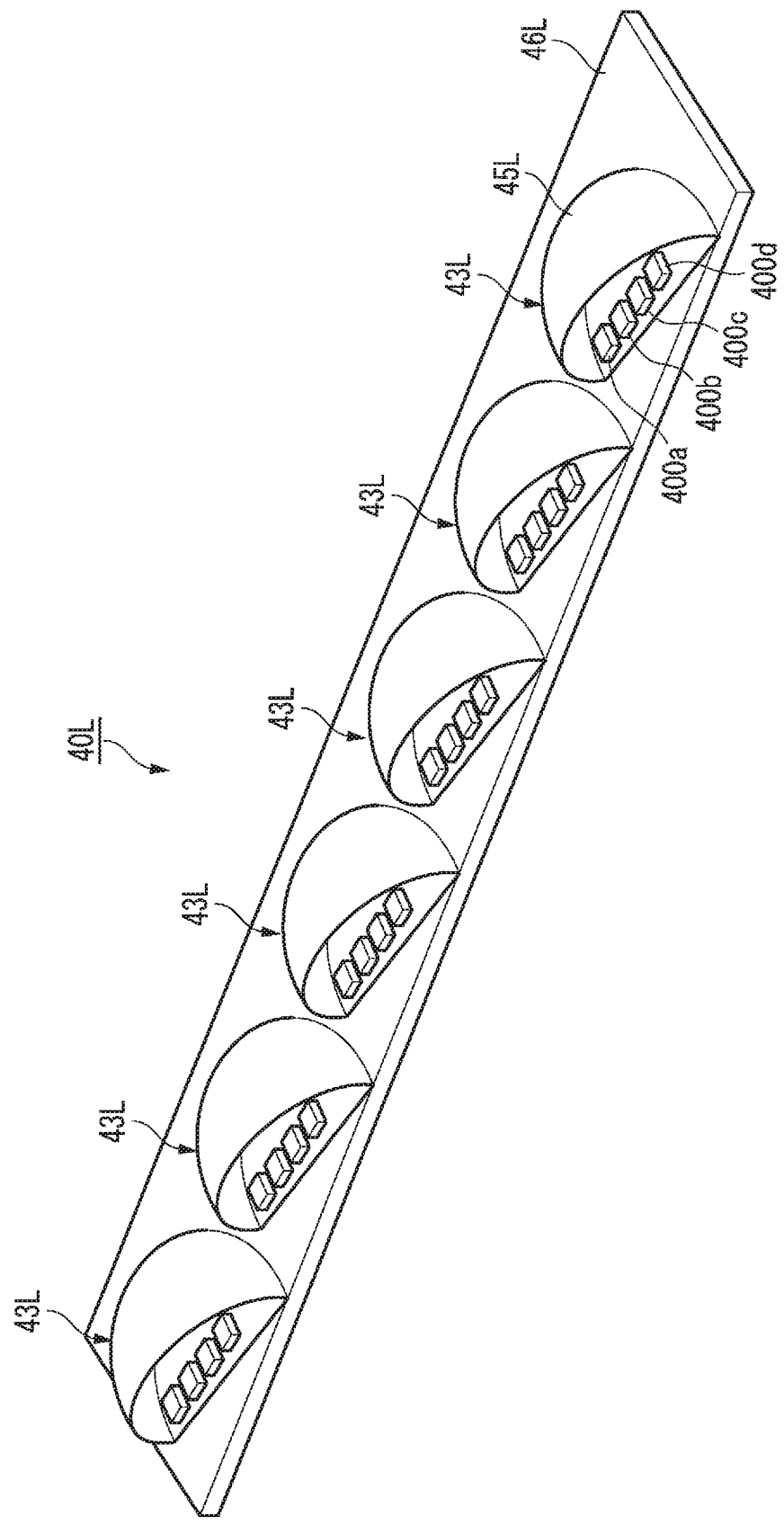
FIG. 4 is a perspective view showing an example left-side illumination unit schematically.

Next, specific configurations of the left-side illumination unit 40L and the right-side illumination unit 40R will be described with reference to FIGS. 3 and 4. FIG. 3 is a block diagram of the left-side illumination unit 40L and the right-side illumination unit 40R. FIG. 4 is a perspective view showing an example of the left-side illumination unit 40L schematically.

Figure 9A:
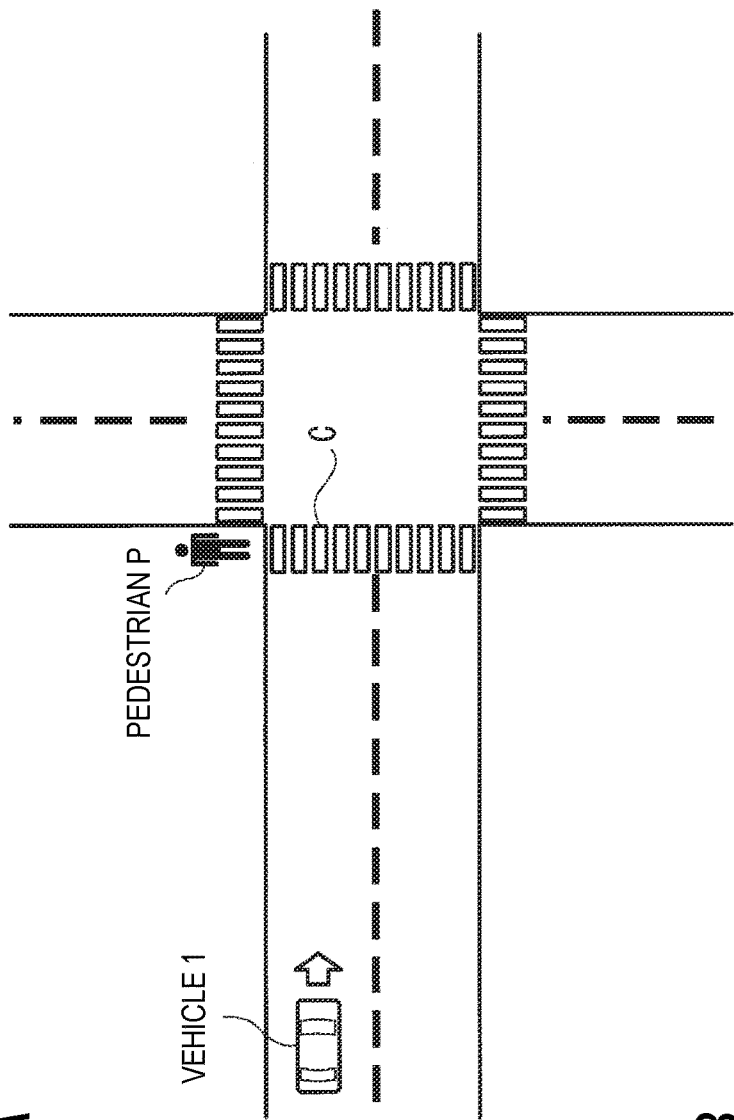
FIG. 9A is a diagram showing a situation involving a pedestrian existing near a pedestrian crossing and the vehicle that is approaching an intersection.
Figure 9B:
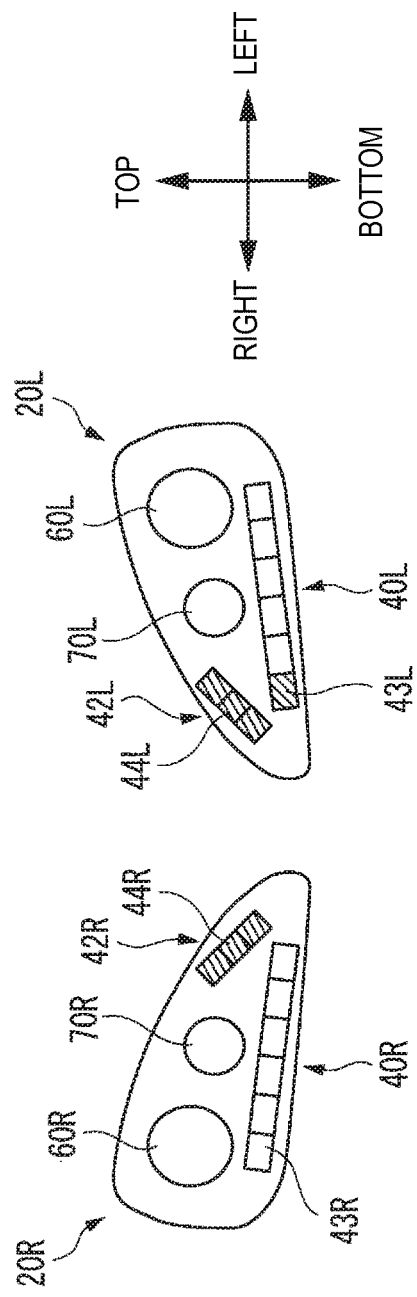
FIG. 9B shows illumination states of a left-side headlamp and a right-side headlamp in the situation shown in FIG. 9A.

As shown in FIG. 3, the left-side illumination unit 40L has six light emission segments 43L (an example of first light emission segments), which are arranged in the left-right direction of the vehicle 1 (see FIG. 9B etc.). Attention should be paid to the fact that the technical meaning of the arrangement of the six light emission segments 43L in the left-right direction indicates not only a state that the six light emission segments 43L are arranged in a direction parallel with the left-right direction but also a state that they are arranged in a direction that is inclined with respect to the left-right direction by a prescribed angle. The prescribed angle is smaller than or equal to 45°.

Each light emission segment 43L includes a red LED (light-emitting diode) 400a (first light emission element) that is configured so as to emit red light, a green LED 400b (second light emission element) that is configured so as to emit green light, a blue LED 400c (third light emission element) that is configured so as to emit blue light, and a white LED 400d (fourth light emission element) that is configured so as to emit white light. In the following, for convenience of description, the red LED 400a, the green LED 400b, the blue LED 400c, and the white LED 400d may be generically referred to simply as LEDs 400.

As shown in FIG. 4, the left-side illumination unit 40L further has a plate-like circuit board 46L which is mounted with the six light emission segments 43L. An interconnection pattern (not shown) for supplying electrical signals to the respective LEDs 400 are formed on the circuit board 46L. The LEDs 400 are arranged on the circuit board 46L so as to be connected electrically to the interconnection pattern formed on the circuit board 46L. Furthermore, each light emission segment 43L has a reflector 45L which is configured so as to reflect light emitted from each LED 400 toward the outside of the vehicle 1. Each reflectors 45L is disposed on the circuit board 46L so as to cover the associated four respective LEDs.

The illumination control unit 47 (see FIG. 2) is electrically connected to the LEDs 400 of each light emission segment 43L by the interconnection pattern formed on the circuit board 46L. For example, when one of the six light emission segments 43L is to emit red light, the illumination control unit 47 supplies an electrical signal (e.g., PWM (pulse width modulation) signal) to the red LED 400a belonging to that light emission segment 43L via the interconnection pattern. Then the red LED 400a emits red light according to the electrical signal supplied from the illumination control unit 47. In this manner, the light emission segment 43L emits red light. When all of the six light emission segments 43L are to emit white light, the illumination control unit 47 supplies an electrical signal to the white LEDs 400d belonging to the respective light emission segments 43L via the interconnection pattern. Then the white LEDs 400d emit white light according to the electrical signal supplied from the illumination control unit 47. In this manner, all of the six light emission segments 43L emit white light.

In the above-described manner, the illumination control unit 47 can change the illumination state (e.g., illumination color, illumination intensity, blinking cycle, etc.) of each light emission segment 43L by performing lighting controls individually on the LEDs 400 belonging to the light emission segment 43L (i.e., by supplying electrical signals to the respective LEDs 400). Furthermore, the illumination control unit 47 can change the illumination state of the left-side illumination unit 40L by changing the illumination states of its respective light emission segments 43L.

The right-side illumination unit 40R has six light emission segments 43R (an example of first light emission segments), which are arranged in the left-right direction of the vehicle 1 (see FIG. 9B etc.). Attention should be paid to the fact that the technical meaning of the arrangement of the six light emission segments 43R in the left-right direction indicates, as described above, a state that they are arranged in a direction that is inclined with respect to the left-right direction by a prescribed angle. The prescribed angle is smaller than or equal to 45°. Each light emission segment 43R has a red LED 400a, a green LED 400b, a blue LED 400c, and a white LED 400d. The specific configuration of the right-side illumination unit 40R is the same as that of the left-side illumination unit 40L shown in FIG. 4.

The illumination control unit 47 is electrically connected to the LEDs 400 of each light emission segment 43R by an interconnection pattern formed on a circuit board. The illumination control unit 47 can change the illumination state (e.g., illumination color, illumination intensity, blinking cycle, etc.) of each light emission segment 43R by performing lighting controls individually on the LEDs 400 belonging to the light emission segment 43R (i.e., by supplying electrical signals to the respective LEDs 400). Furthermore, the illumination control unit 47 can change the illumination state of the right-side illumination unit 40R by changing the illumination states of its respective light emission segments 43R. As such, the illumination control method of the right-side illumination unit 40R is the same as that of the left-side illumination unit 40L shown in FIG. 4.

Figure 5:
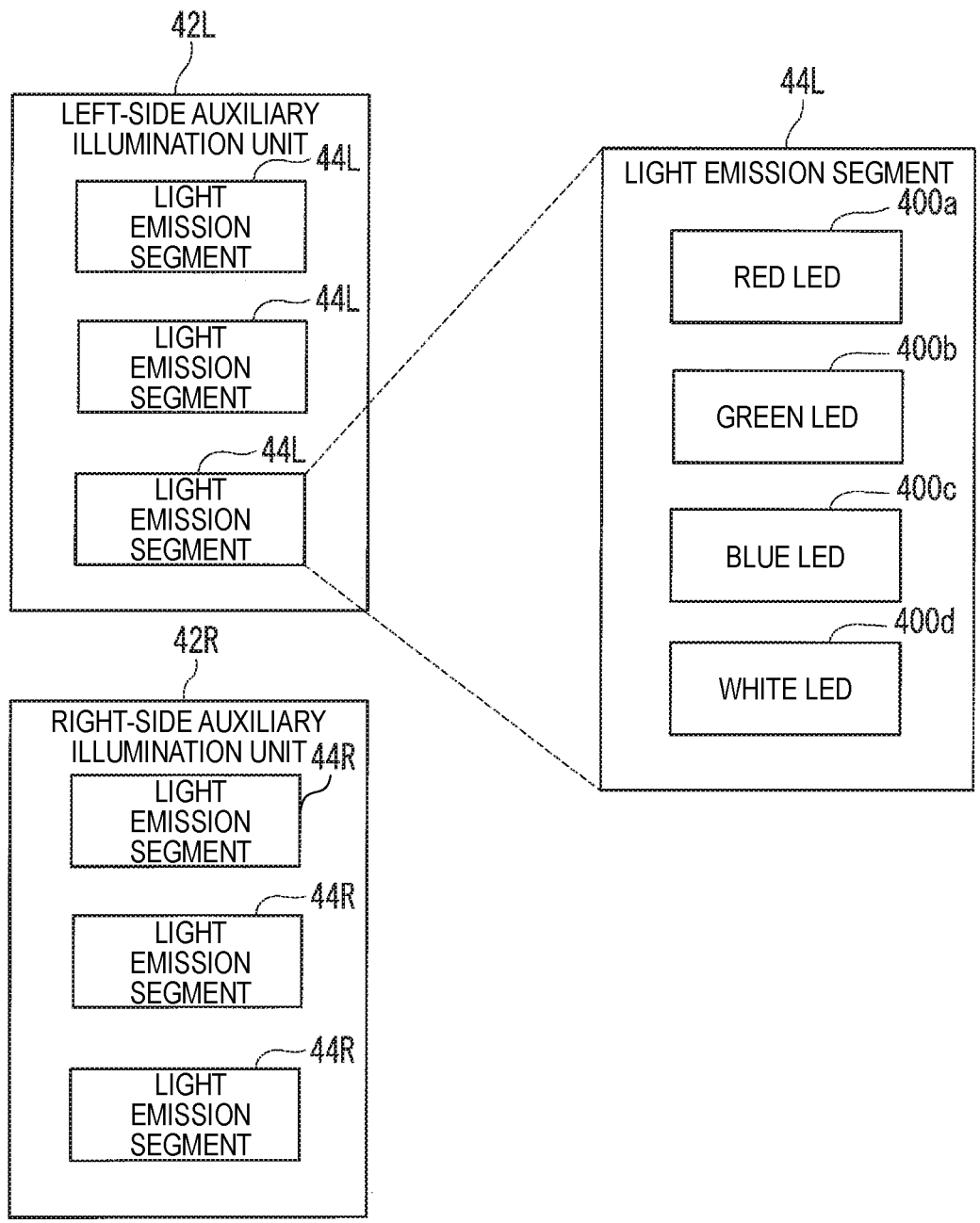
FIG. 5 is a block diagram of a left-side auxiliary illumination unit and a right-side auxiliary illumination unit.
Figure 6:
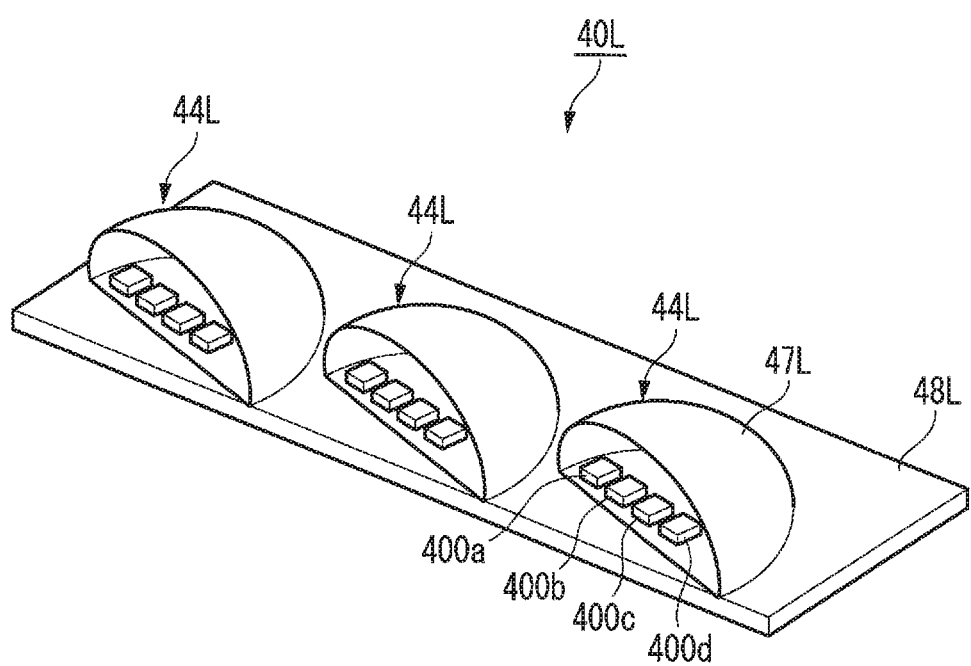
FIG. 6 is a perspective view showing an example left-side auxiliary illumination unit.

Next, specific configurations of the left-side auxiliary illumination unit 42L and the right-side auxiliary illumination unit 42R will be described with reference to FIGS. 5 and 6. FIG. 5 is a block diagram of the left-side auxiliary illumination unit 42L and the right-side auxiliary illumination unit 42R. FIG. 4 is a perspective view showing an example of the left-side illumination unit 40L schematically.

As shown in FIG. 5, the left-side auxiliary illumination unit 42L has three light emission segment 44L (an example of second light emission segments), which are arranged in a direction that is inclined with respect to the extension direction (left-right direction) of the left-side illumination unit 40L (see FIG. 9B etc.).

Each light emission segment 44L includes a red LED 400a (first light emission element), a green LED 400b (second light emission element), a blue LED 400c (third light emission element), and a white LED 400d (fourth light emission element). As shown in FIG. 6, the left-side auxiliary illumination unit 42L further has a plate-like circuit board 48L which is mounted with the three light emission segments 44L. An interconnection pattern (not shown) for supplying electrical signals to the respective LEDs 400 are formed on the circuit board 48L. The LEDs 400 are arranged on the circuit board 48L so as to be connected electrically to the interconnection pattern formed on the circuit board 48L. Furthermore, each light emission segment 44L has a reflector 47L which is configured so as to reflect light emitted from each LED 400 toward the outside of the vehicle 1. Each reflector 48L is disposed on the circuit board 48L so as to cover the associated four respective LEDs.

The illumination control unit 47 is electrically connected to the LEDs 400 of each light emission segment 44L by an interconnection pattern formed on a circuit board. The illumination control unit 47 can change the illumination state (e.g., illumination color, illumination intensity, blinking cycle, etc.) of each light emission segment 44L by performing lighting controls individually on the LEDs 400 belonging to the light emission segment 44L (i.e., by supplying electrical signals to the respective LEDs 400). Furthermore, the illumination control unit 47 can change the illumination state of the left-side auxiliary illumination unit 42L by changing the illumination states of its respective light emission segments 44L.

The right-side auxiliary illumination unit 42R has three light emission segment 44R (an example of second light emission segments), which are arranged in a direction that is inclined with respect to the extension direction (left-right direction) of the right-side illumination unit 40R (see FIG. 9B etc.). Each light emission segment 44R includes a red LED 400a, a green LED 400b, a blue LED 400c, and a white LED 400d. The specific configuration of the right-side auxiliary illumination unit 42R is the same as that of the left-side auxiliary illumination unit 42L shown in FIG. 6.

The illumination control unit 47 is electrically connected to the LEDs 400 of each light emission segment 44R by an interconnection pattern formed on a circuit board. The illumination control unit 47 can change the illumination state (e.g., illumination color, illumination intensity, blinking cycle, etc.) of each light emission segment 44R by performing lighting controls individually on the LEDs 400 belonging to the light emission segment 44R (i.e., by supplying electrical signals to the respective LEDs 400). Furthermore, the illumination control unit 47 can change the illumination state of the right-side auxiliary illumination unit 42R by changing the illumination states of its respective light emission segments 44R. As such, the illumination control method of the right-side auxiliary illumination unit 42R is the same as that of the left-side auxiliary illumination unit 42L shown in FIG. 6.

Figure 7:
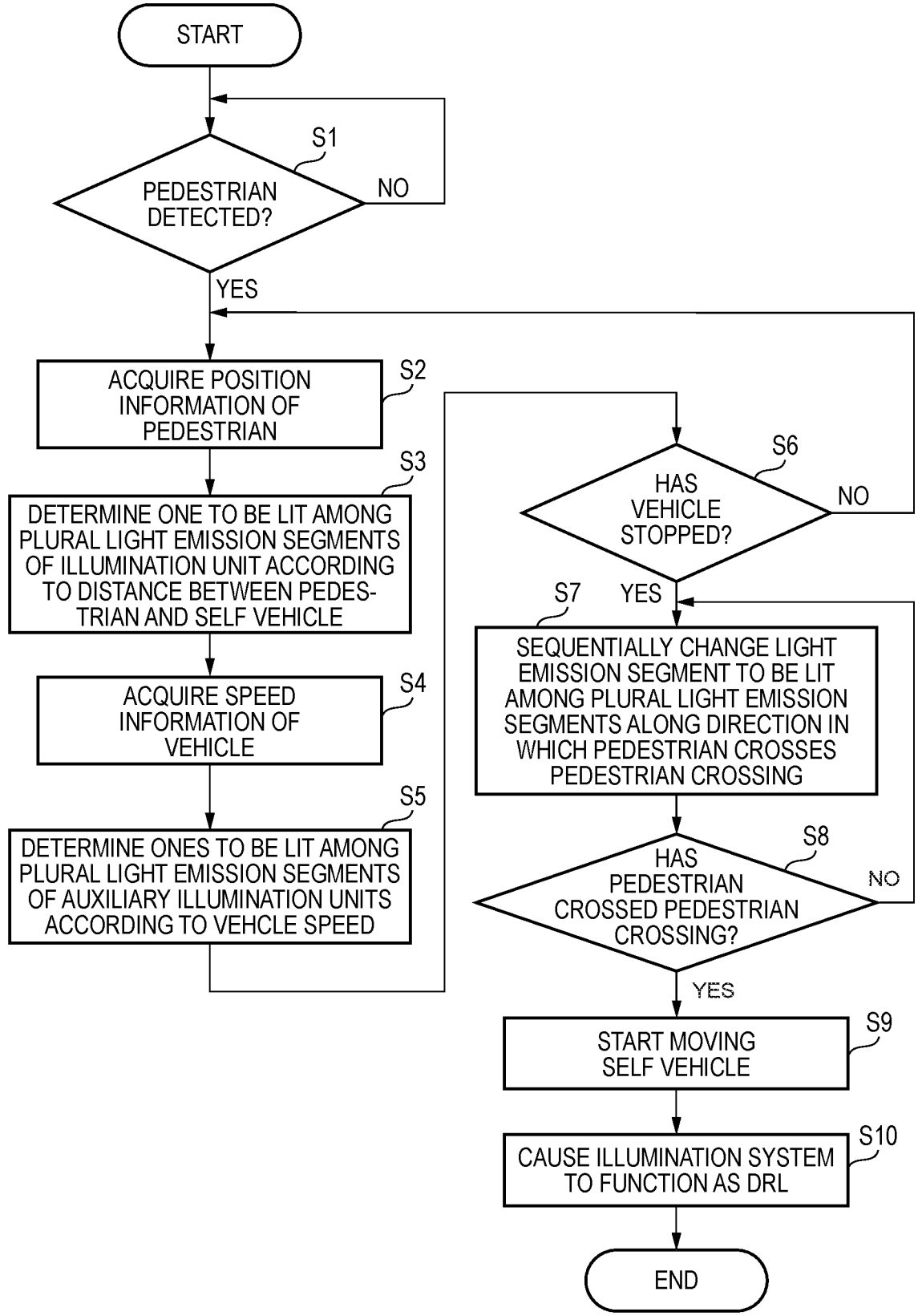
FIG. 7 is a flowchart for description of an operation flow of the vehicular illumination system according to the first embodiment.

Next, an operation flow of the illumination system 4 will be described with reference to FIGS. 7-13. FIG. 7 is a flowchart for description of the operation flow of the illumination system 4. FIG. 8A is a rough diagram showing how the illumination state of the left-side auxiliary illumination unit 42L is changed according to the speed V of the vehicle 1. FIG. 8B is a graph showing a relationship between the speed V of the vehicle 1 and the number N of lit segments 44L of the left-side auxiliary illumination unit 42L. FIG. 9A is a diagram showing a situation involving a pedestrian P existing near a pedestrian crossing C and the vehicle 1 that is approaching the pedestrian crossing C. FIG. 9B shows illumination states of the left-side headlamp 20L and the right-side headlamp 20R in the situation shown in FIG. 9A. FIG. 10 and the following figures are basically similar to FIGS. 9A and 9B.

As shown in FIGS. 7 and 9, first (at step S1), the vehicle control unit 3 (detection unit) detects the pedestrian P (target object) who exists near the pedestrian crossing C ahead of the vehicle 1 that is running in the autonomous drive mode (in particular, complete autonomous drive mode or high-level drive assist mode). More specifically, the camera 6 and/or the radar 7 acquires surrounding environment information (e.g., image data) relating to the vehicle 1 and transmits the acquired surrounding environment information to the vehicle control unit 3. The vehicle control unit 3 detects the pedestrian P existing near the pedestrian crossing C on the basis of the surrounding environment information transmitted from the camera 6 and/or the radar 7. If the pedestrian P is detected (step S1: yes), the vehicle control unit 3 (position information acquiring unit) acquires position information of the pedestrian P on the received surrounding environment information (step S2). The position information of the pedestrian P is information relating to a relative position of the pedestrian P with respect to the vehicle 1. On the other hand, if the pedestrian P is not detected (step S1: no), the process returns to step S1.

In the above process, the vehicle control unit 3 functions as the detection unit for detecting the pedestrian P and the position information acquiring unit for acquiring position information of the pedestrian P. Alternatively, the camera 6 and/or the radar 7 may function as the detection unit for detecting the pedestrian P1 and the position information acquiring unit.

As still another alternative, the vehicle control unit 3 may detect the pedestrian P and acquire position information of the pedestrian P by performing a V2P communication via the wireless communication unit 10. In this case, the wireless communication unit 10 receives position information of the pedestrian P (position coordinates of the pedestrian P) from a portable electronic device such as a cellphone, a smartphone, a tablet terminal, a wearable device, or the like carried by the pedestrian P and provides the position information to the vehicle control unit 3. The vehicle control unit 3 may acquire information relating to a position of the pedestrian P relative to the vehicle 1 (position information of the pedestrian P) on the basis of the position information of the pedestrian P (position coordinates of the pedestrian P) acquired from the portable electronic device via the wireless communication unit 10 and position information of the vehicle 1 (position coordinates of the vehicle 1) acquired via the GPS device 9.

As a further alternative, the vehicle control unit 3 may detect the pedestrian P and acquire position information of the pedestrian P by performing a V2I communication via the wireless communication unit 10. For example, an infrastructure facility located near the pedestrian P (e.g., traffic lights installed near the intersection), which is equipped with an image acquiring means such as a camera capable of acquiring an image of the pedestrian P, detects presence of the pedestrian P by the image acquiring means and acquires position information of the pedestrian P (position coordinates of the pedestrian P). The wireless communication unit 10 receives the position information etc. of the pedestrian P from the infrastructure facility and provides the position information etc. to the vehicle control unit 3. The vehicle control unit 3 may acquire information relating to a position of the pedestrian P relative to the vehicle 1 (position information of the pedestrian P) on the basis of the position information of the pedestrian P (position coordinates of the pedestrian P) acquired from the infrastructure facility via the wireless communication unit 10 and position information of the vehicle 1 (position coordinates of the vehicle 1) acquired via the GPS device 9.

Then, at step S3, the vehicle control unit 3 determines a light emission segment 43L to be lit according to a distance D (example relative positional relationship) between the pedestrian P and the vehicle 1. More specifically, the vehicle control unit 3 may determine a distance D between the pedestrian P and the vehicle 1 on the basis of the position information of the pedestrian P (information relating to the position of the pedestrian P relative to the vehicle 1). For example, the distance D may be a shortest distance between the pedestrian P and the vehicle 1.

Then the vehicle control unit 3 determines a light emission segment 43L to be lit of the left-side illumination unit 40L according to the determined distance D. In this connection, a first table showing a relationship between the range of the distance D between a pedestrian P and the vehicle 1 and the light emission segment 43L to be lit may be stored in the vehicle control unit 3 (ROM) in advance. In this case, the vehicle control unit 3 may determine a light emission segment 43L to be lit on the basis of the determined distance D and the first table showing the relationship between the distance D range and the light emission segment 43L to be lit.

Subsequently, the vehicle control unit 3 generates an illumination control signal that specifies the light emission segment 43L to be lit and transmits the illumination control signal to the illumination control unit 47. The illumination control unit 47 supplies an electrical signal to the light emission segment 43L to be lit (i.e., specified light emission segment 43L) on the basis of the received illumination control signal. Thus, the specified light emission segment 43L is lit by the electrical signal supplied from the illumination control unit 47.

For example, to light, in green, the light emission segment 43L to be lit, the vehicle control unit 3 generates an illumination control signal specifying the green LED 400*b* belonging to the light emission segment 43L to be lit according to the determined distance D and transmits the illumination control signal to the illumination control unit 47. The illumination control unit 47 supplies an electrical signal to the green LED 400*b* belonging to the light emission segment 43L to be lit on the basis of the received illumination control signal. As a result, the light emission segment 43L to be lit is lit in green by the electrical signal supplied from the illumination control unit 47. Likewise, the specified light emission segment 43L can be lit in red by supplying an electrical signal to the red LED 400*a*. The specified light emission segment 43L can be lit in blue by supplying an electrical signal to the blue LED 400*c*. The specified light emission segment 43L can be lit in white by supplying an electrical signal to the white LED 400*d*.

Instead of the vehicle control unit 3, the illumination control unit 47 may determine a light emission segment 43L to be lit of the left-side illumination unit 40L according to the determined distance D. In this case, first, the vehicle control unit 3 transmits information relating to the distance D between the pedestrian P and the vehicle 1 to the illumination control unit 47. Then the illumination control unit 47 determines a light emission segment 43L to be lit of the left-side illumination unit 40L on the basis of the information relating to the distance D and the first table. The illumination control unit 47 thereafter supplies an electrical signal to the light emission segment 43L to be lit. Thus, the specified light emission segment 43L is lit by the electrical signal supplied from the illumination control unit 47. In this case, the first table may be stored in a memory (ROM) of the illumination control unit 47 in advance.

Then, at step S4, the vehicle control unit 3 (speed control unit) acquires speed information indicating a speed of the vehicle 1 from the sensor 5 (speed sensor). The vehicle control unit 3 thereafter determines a light emission segment(s) 44L to be lit of the left-side auxiliary illumination unit 42L and a light emission segment(s) 44R to be lit of the right-side auxiliary illumination unit 42R according to the acquired speed information (step S5). More specifically, the vehicle control unit 3 may determine a light emission segment(s) 44L (44R) to be lit on the basis of a number-of-lighting-segments determination table showing a relationship between the speed V of the vehicle 1 and the number N of light emission segment 44L (44R) to be lit and the speed information (the speed V of the vehicle 1). The number-of-lighting-segments determination table may be stored in, for example, a memory (ROM) of the vehicle control unit 3 in advance.

For example, as shown in FIG. 8, if the speed V of the vehicle 1 is higher than 60 km/h (V>60 km/h), the vehicle control unit 3 sets the number N of light emission segment 44L to be lit to 3. That is, the vehicle control unit 3 decides that all the light emission segment 44L should be lit. If the speed V of the vehicle 1 is higher than 30 km/h and lower than or equal to 60 km/h (30<V≤60 km/h), the vehicle control unit 3 sets the number N of light emission segment 44L to be lit to 2. In this case, the vehicle control unit 3 decides that the first-step light emission segment 44L (lowest light emission segment) and the second-step light emission segment 44L (middle light emission segment) should be lit. If the speed V of the vehicle 1 is higher than 0 km/h and lower than or equal to 30 km/h (0<V≤30 km/h), the vehicle control unit 3 sets the number N of light emission segment 44L to be lit to 1. In this case, the vehicle control unit 3 decides that only the first-step light emission segment 44L should be lit. Finally, if speed V of the vehicle 1 is 0 km/h (i.e., the vehicle 1 is stopped), the vehicle control unit 3 sets the number N of light emission segment 44L to be lit to 0. In this case, the vehicle control unit 3 decides that none of the light emission segments 44L should be lit. The vehicle control unit 3 can determine the number N of light emission segments 44R to be lit according to the speed V of the vehicle 1 by the same method as shown in FIG. 8. It is noted that the relationship shown in FIG. 8 between the number N of light emission segments to be lit and the speed V is just an example.

After determining the light emission segments 44L and 44R to be lit, the vehicle control unit 3 generates an illumination control signal that specifies the light emission segments 44L and 44R to be lit and transmits the illumination control signal to the illumination control unit 47. The illumination control unit 47 thereafter supplies electrical signals to the light emission segments 44L to be lit (i.e., specified light emission segments 43L) and supplies electrical signals to the light emission segments 44R to be lit (i.e., specified light emission segments 44R). Thus, the specified light emission segments 44L and 44R are lit by the electrical signals supplied from the illumination control unit 47.

Instead of the vehicle control unit 3, the illumination control unit 47 may determine light emission segments 44L and 44R to be lit according to the speed V of the vehicle 1. In this case, first, the vehicle control unit 3 transmits the speed information acquired from the sensors 5. Then the illumination control unit 47 determines light emission segments 44L and 44R to be lit on the basis of the speed information and the number-of-lighting-segments determination table. The number-of-lighting-segments determination table may be stored in a memory (e.g., ROM) of the illumination control unit 47. The illumination control unit 47 thereafter supplies electrical signals to the light emission segments 44L and 44R to be lit. Thus, the specified light emission segments 44L and 44R are lit by the electrical signals supplied from the illumination control unit 47.

Then, at step S6, the vehicle control unit 3 determines whether the vehicle 1 has stopped short of the pedestrian crossing C on the basis of running state information (speed information) of the vehicle 1 acquired by the sensors 5 and surrounding environment information acquired by the camera 6 and/or the radar 7. If it is determined that the vehicle 1 has not stopped short of the pedestrian crossing C (i.e., the vehicle 1 is running; step S6: no), the process returns to step S2. In this manner, the series of steps S2-S5 is executed repeatedly until it is determined that the vehicle 1 has stopped.

For example, as shown in FIG. 9, if the distance D between the vehicle 1 and the pedestrian P is equal to D1, the vehicle control unit 3 determines that the rightmost one of the six light emission segments 43L should be lit and transmits an illumination control signal to the illumination control unit 47. The illumination control unit 47 lights the rightmost light emission segment 43L on the basis of the received illumination control signal. There are no particular limitations on the illumination color of the rightmost light emission segment 43L; for example, the rightmost light emission segment 43L may be lit in red.

Furthermore, if the speed V of the vehicle 1 is higher than 60 km/h, the vehicle control unit 3 determines that the three light emission segments 44L of the left-side auxiliary illumination unit 42L and the three light emission segments 44R of the right-side auxiliary illumination unit 42R should be lit and transmits an illumination control signal to the illumination control unit 47. The illumination control unit 47 lights the three light emission segments 44L and the three light emission segments 44R on the basis of the received illumination control signal. There are no particular limitations on the illumination color of the light emission segments 44R.

As shown in FIG. 10, if the distance D between the vehicle 1 and the pedestrian P is equal to D2 (since the vehicle 1 is running toward the intersection, a relationship D2<D1 holds), the vehicle control unit 3 determines that the third light emission segment 43L from the right of the left-side illumination unit 40L among the six light emission segments 43L of the left-side illumination unit 40L should be lit and transmits an illumination control signal to the illumination control unit 47. The illumination control unit 47 lights the third light emission segment 43L from the right on the basis of the received illumination control signal.

Furthermore, if the speed V of the vehicle 1 satisfies a relationship 30 km/h<V≤60 km/h, the vehicle control unit 3 determines that two light emission segments 44L of the left-side auxiliary illumination unit 42L and two light emission segments 44R of the right-side auxiliary illumination unit 42R should be lit and transmits an illumination control signal to the illumination control unit 47. The illumination control unit 47 lights the two light emission segments 44L and the two light emission segments 44R on the basis of the received illumination control signal.

Figure 11A:
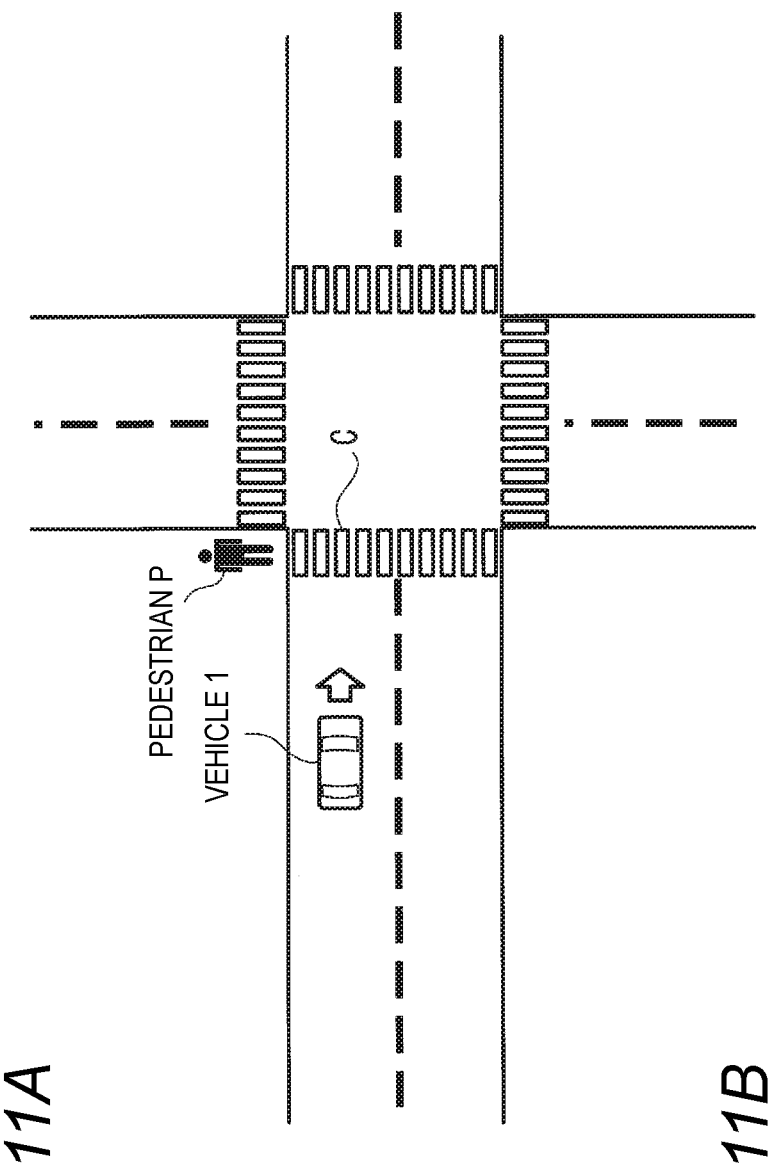
FIG. 11A is a diagram showing a situation involving the pedestrian existing near the pedestrian crossing and the vehicle that is approaching the intersection.
Figure 11B:
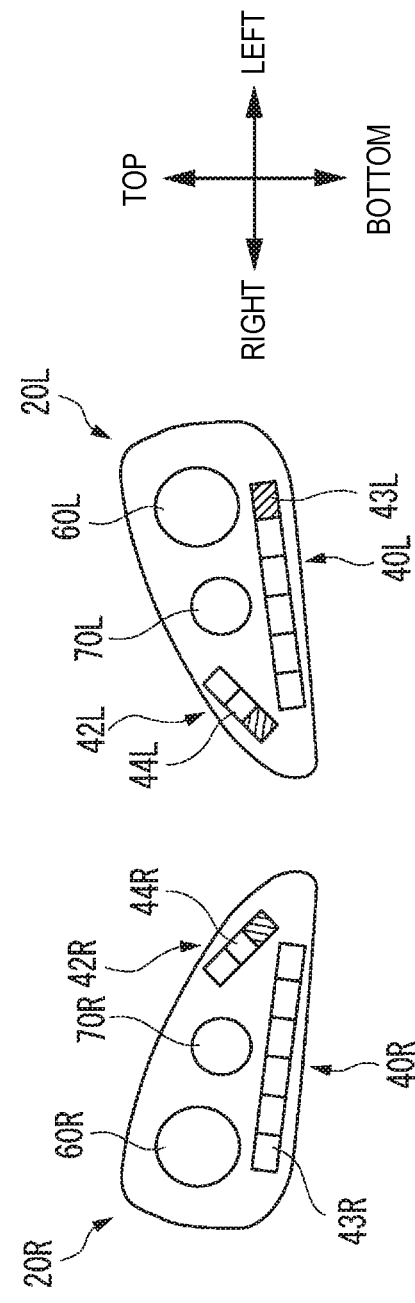
FIG. 11B shows illumination states of the left-side headlamp and the right-side headlamp in the situation shown in FIG. 11A.

As shown in FIG. 11, if the distance D between the vehicle 1 and the pedestrian P is equal to D3 (since the vehicle 1 is running toward the intersection, a relationship D3<D2 holds), the vehicle control unit 3 determines that the leftmost light emission segment 43L of the left-side illumination unit 40L among the six light emission segments 43L of the left-side illumination unit 40L should be lit and transmits an illumination control signal to the illumination control unit 47. The illumination control unit 47 lights the leftmost light emission segment 43L on the basis of the received illumination control signal.

Furthermore, if the speed V of the vehicle 1 satisfies a relationship 0 km/h<V≤30 km/h, the vehicle control unit 3 determines that the lowermost light emission segment 44L of the left-side auxiliary illumination unit 42L and the lowermost light emission segment 44R of the right-side auxiliary illumination unit 42R should be lit and transmits an illumination control signal to the illumination control unit 47. The illumination control unit 47 lights the lowermost light emission segment 44L and the lowermost light emission segment 44R on the basis of the received illumination control signal.

Although not shown in any drawings, the illumination control unit 47 may light the second, fourth, or fifth light emission segment 43L from the right of the left-side illumination unit 40L according to the distance D between the vehicle 1 and the pedestrian P. In this case, the second light emission segment 43L from the right may be lit if the distance D is equal to D2. The fourth light emission segment 43L from the right may be lit if the distance D is equal to D4. The fifth light emission segment 43L from the right may be lit if the distance D is equal to D5. In this case, a relationship D1>D2>D3>D4>D5>D6 holds.

In the embodiment, the illumination control unit 47 is configured so as to change the illumination state of the left-side illumination unit 40L according to the distance D between the vehicle 1 and the pedestrian P. In particular, the illumination control unit 47 is configured so as to change, in order, the light emission segment 43L to be lit among the six light emission segments 43L of the left-side illumination unit 40L according to the distance D between the vehicle 1 and the pedestrian P. In this case, the illumination control unit 47 may change the light emission segment 43L to be lit in order from the rightmost one to the leftmost one.

Furthermore, the illumination control unit 47 is configured so as to change the illumination state of the left-side auxiliary illumination unit 42L and the illumination state of the right-side auxiliary illumination unit 42R according to the speed V of the vehicle 1. In particular, the illumination control unit 47 is configured so as to change the number of light emission segments 44L/44R to be lit according to the speed V of the vehicle 1.

According to the embodiment, since as described above the light emission segment 43L to be lit among the plural light emission segments 43L of the left-side illumination unit 40L is changed in order according to the distance D between the vehicle 1 and the pedestrian P, the pedestrian P can recognize that the vehicle 1 that is approaching the pedestrian P is aware of the pedestrian P. Furthermore, since the number of light emission segments 44L/44R to be lit is changed according to the speed V of the vehicle 1, the pedestrian P can recognize that the vehicle 1 is decelerating (or accelerating) by seeing that the number of lit light emission segments 44L/44R changes. In this case, by seeing that the number of lit light emission segments 44L/44R changes, the pedestrian P can recognize intuitively that the vehicle 1 is decelerating. For example, by recognizing that the number of lit light emission segments 44L/44R has decreased, the pedestrian P existing near the pedestrian crossing C can predict that the vehicle 1 will stop short of the pedestrian crossing C. Thus, the illumination system 4 can be provided that can present, to a pedestrian P, a running state of the vehicle 1 and the fact that the vehicle 1 is aware of the pedestrian P.

Although in the embodiment the illumination control unit 47 changes the illumination state of only the left-side illumination unit 40L because the pedestrian P exists on the left side of the vehicle 1, it may change the illumination state of both of the left-side illumination unit 40L and the right-side illumination unit 40R. In this case, the illumination control unit 47 may change the illumination state of the right-side illumination unit 40R so that the light emission segment 43R to be lit is changed in order while changing the illumination state of the left-side illumination unit 40L so that the light emission segment 43L to be lit is changed in order. Furthermore, where a pedestrian P exists on the right side of the vehicle 1, the illumination control unit 47 may change the illumination state of either only the right-side illumination unit 40R or both of the left-side illumination unit 40L and the right-side illumination unit 40R. As a further alternative, the illumination control unit 47 may change the illumination state of one of the left-side illumination unit 40L and the right-side illumination unit 40R while causing the other of the left-side illumination unit 40L and the right-side illumination unit 40R to function as a daytime running lamp (DRL) or a turn signal lamp (TSL).

Although in the embodiment the illumination control unit 47 changes the illumination state of both of the left-side auxiliary illumination unit 42L and the right-side auxiliary illumination unit 42R according to the speed V of the vehicle 1, it may change the illumination state of only one of the left-side auxiliary illumination unit 42L and the right-side auxiliary illumination unit 42R. For example, where a pedestrian P exists on the left side of the vehicle 1, it may change the illumination state of only the left-side auxiliary illumination unit 42L.

Although in the embodiment the illumination control unit 47 changes, in order, the light emission segment 43L to be lit, conversely the illumination control unit 47 may change, in order, the light emission segment 43L to be turned off. In this case, all the light emission segments 43L of the left-side illumination unit 40L are lit before detection of the pedestrian P. The illumination control unit 47 may thereafter change, in order, the light emission segment 43L to be turned off among the six light emission segments 43L according to the distance D between the vehicle 1 and the pedestrian P. In this case, the illumination control unit 47 may change the light emission segment 43L to be turned off in order from the right end to the left end. Although in the embodiment the illumination control unit 47 lights one of the six light emission segments 43L according to the distance D, it may turn on or off two or more light emission segments 43L according to the distance D.

Likewise, although the illumination control unit 47 changes the number of light emission segments 44L/44R to be lit, conversely the illumination control unit 47 may change the number of light emission segments 44L/44R to be turned off. In this case, all the light emission segments 44L/44R are lit when the vehicle 1 is stopped and the number of light emission segments 44L/44R to be turned off increases as the speed V of the vehicle 1 increases.

The illumination control unit 47 may change the illumination state of the left-side illumination unit 40L by blinking a light emission segment 43L. For example, the illumination control unit 47 may change the illumination state of the left-side illumination unit 40L by changing, in order, the light emission segment 43L to be blinked. Likewise, the illumination control unit 47 may change the illumination state of the right-side illumination unit 40R by changing, in order, the light emission segment 43R to be blinked. The blinking cycle of a light emission segment 43L may be either fixed or variable. Where the blinking cycle of a light emission segment 43L is variable, the illumination control unit 47 may set the blinking cycle of a light emission segment 43R to be blinked at T1 for a prescribed period (e.g., several seconds) after detection of the pedestrian P and set the blinking cycle of the light emission segment 43R to be blinked at T2 that is longer than T1. Setting the blinking cycle of a light emission segment 43R short for the prescribed period after detection of the pedestrian P allows the pedestrian P to easily recognize that the vehicle 1 is aware of the pedestrian P.

Likewise, the illumination control unit 47 may change the illumination state of the left-side auxiliary illumination unit 42L/right-side auxiliary illumination unit 42R by changing the number of light emission segments 44L/44R to be blinked.

In the embodiment, the illumination control unit 47 may light one of all of the light emission segments 43L in a first illumination color (e.g., green) while lighting the remaining light emission segments 43L in a second illumination color (e.g., white) that is different from the first illumination color. While performing this control, the illumination control unit 47 may change, in order, the light emission segment 43L to be lit in the first illumination color.

Likewise, the illumination control unit 47 may light all the light emission segments 44L and 44R in a first color (e.g., white) in a state that the vehicle 1 is stopped and change the number of light emission segments 44L/44R to be lit in a second illumination color (e.g., green) according to the speed V of the vehicle 1. For example, the illumination control unit 47 may increase the number of light emission segments 44L/44R to be lit in the second illumination color as the speed V of the vehicle 1 increases.

The vehicle control unit 3 may determine a light emission segment 43L to be lit according to the angle θ (example relative positional relationship) that is defined by a line segment connecting the vehicle 1 and the pedestrian P and a running direction of the vehicle 1. More specifically, the vehicle control unit 3 may determine an angle θ on the basis of position information of the pedestrian P (information relating to a position of the pedestrian P relative to the vehicle 1) and determine a light emission segment 43L to be lit of the left-side illumination unit 40L according to the determined angle θ.

Subsequently, returning to FIG. 7, if the vehicle control unit 3 determines that the vehicle 1 has stopped short of the pedestrian crossing C (step S6: yes), the illumination control unit 47 changes, in order, the light emission segment to be lit among the six light emission segments 43L and the six light emission segments 43R in a direction in which the pedestrian P moves along the pedestrian crossing C (hereinafter referred to as a movement direction) (step S7). As such, if the vehicle 1 has stopped after detecting the pedestrian P, the illumination control unit 47 changes the illumination state of the left-side illumination unit 40L and the right-side illumination unit 40R.

More specifically, if determining that the vehicle 1 has stopped on the basis of running state information of the vehicle 1 acquired by the sensors 5, the vehicle control unit 3 then determines a movement direction of the pedestrian P by determining whether the pedestrian P exists on the left side or right side of the vehicle 1. For example, as shown in FIG. 12A, in the case where the pedestrian P exists on the left side of the vehicle 1, the vehicle control unit 3 determines that the pedestrian P exists on the left side of the vehicle 1 and determines that the movement direction of the pedestrian P is rightward when viewed from the vehicle 1. Conversely, where the pedestrian P exists on the right side of the vehicle 1, the vehicle control unit 3 determines that the pedestrian P exists on the right side of the vehicle 1 and determines that the movement direction of the pedestrian P is leftward when viewed from the vehicle 1.

Then the vehicle control unit 3 generates an illumination control signal that commands generation of an illumination pattern that lighting proceeds in order in the movement direction of the pedestrian P and transmits the illumination control signal to the illumination control unit 47. The illumination control unit 47 changes, in order, the light emission segment to be lit of the six light emission segments 43L and the six light emission segments 43R on the basis of the received illumination control signal. For example, in the situation shown in FIG. 12A, after the vehicle control unit 3 transmits the illumination control unit 47 an illumination control signal that commands generation of an illumination pattern that lighting proceeds rightward in order, the illumination control unit 47 changes the light emission segment to be lit rightward in order on the basis of the received illumination control signal. In FIG. 12B, the leftmost light emission segment 43L, the fourth left light emission segment 43L of the left-side illumination unit 40L, and the fourth left light emission segment 43R of the right-side illumination unit 40R are lit in order. However, actually, one light emission segment or two or more light emission segments located between the leftmost light emission segment 43L (hereinafter referred to as a light emission segment 43Lm) and the rightmost light emission segment 43 (hereinafter referred to as a light emission segment 43Rm) may be lit each time as sequential lighting proceeds. The sequential lighting includes a case that one light emission segment located between the light emission segment 43Lm and the light emission segment 43Rm is lit each time not only in such a manner that every light emission segment is lit as a result but also a case that in such a manner that every other light emission segment (or every two light emission segments) is lit as a result.

Then, at step S8, the vehicle control unit 3 determines whether the pedestrian P has crossed the pedestrian crossing C on the basis of surrounding environment information transmitted from the camera and/or the radar 7. If it is determined that the pedestrian P has not crossed the road yet using the pedestrian crossing C (step S8: no), the process returns to step S7. In this manner, while the pedestrian P is moving along the pedestrian crossing C, step S7 is executed repeatedly as shown in FIG. 12B.

In the embodiment, the illumination state of the left-side illumination unit 40L and the right-side illumination unit 40R is changed by lighting, in order, the light emission segment to be lit among the six light emission segments 43L and the six light emission segments 43R in a movement direction of the pedestrian P. Thus, the pedestrian P existing near the pedestrian crossing C can recognize whether the vehicle 1 is aware of the pedestrian P by seeing that light emission segments are lit in order, and hence can cross the road at ease using the pedestrian crossing C. As a result, the pedestrian P is urged to cross the road using the pedestrian crossing C by the sequential changes of the lit light emission segment in the movement direction of the pedestrian P.

Although in the embodiment the light emission segment to be lit is changed in order among the light emission segments 43L and 43R, conversely the light emission segment to be turned off may be changed among the light emission segments 43L and 43R. For example, all the light emission segments 43L and 43R are lit immediately after the vehicle 1 has stopped short of the pedestrian crossing C. Subsequently, the illumination control unit 47 changes, in order, the light emission segment to be turned off among the six light emission segments 43L and the six light emission segments 43R according to a movement direction of the pedestrian P on the basis of an illumination control signal corresponding to the movement direction of the pedestrian P. In the following, the light emission segments 43L and 43R may be referred to simply as light emission segments 43.

The illumination control unit 47 may change, in order, the light emission segment to be blinked. The blinking cycle of a light emission segment 43 may be either fixed or variable. Where the blinking cycle of a light emission segment 43 is variable, the illumination control unit 47 may set the blinking cycle of the light emission segment 43 to be blinked at T1 for a prescribed period (e.g., several seconds) after the stop of the vehicle 1 and set it at T2 that is longer than T1 after a lapse of the prescribed period. Setting the blinking cycle of a light emission segment 43 short for the prescribed period after the stop of the vehicle 1 allows the pedestrian P to easily recognize that the vehicle 1 is aware of the pedestrian P.

The illumination control unit 47 may change the illumination color of the light emission segments 43L and 43R in order. For example, the illumination control unit 47 lights all the light emission segments 43L and 43R in white immediately after the vehicle 1 has stopped short of the pedestrian crossing C. Then the illumination control unit 47 changes, in order, the light emission segment to be lit in green among the six light emission segments 43L and the six light emission segments 43R in the movement direction of the pedestrian P on the basis of an illumination control signal that commands generation of an illumination pattern that lighting proceeds in order in the movement direction of the pedestrian P. In this example, one of all of the light emission segments 43 is lit in green and the remaining light emission segments 43 are lit in white. Furthermore, the light emission segment that is lit in green is changed in order in the movement direction of the pedestrian P. Although in this example, the light emission segments are lit in green in order, the light emission segments may be lit in another color in order.

Although in the embodiment the illumination control unit 47 changes the illumination state of the left-side illumination unit 40L and the right-side illumination unit 40R when the vehicle 1 is stopped after detection of the pedestrian P, the illumination state of only one of the left-side illumination unit 40L and the right-side illumination unit 40R may be changed.

In the embodiment, when the vehicle 1 has stopped short of the pedestrian crossing C, the illumination control unit 47 changes, in order, the light emission segment 43 to be lit. However, to present information indicating that the vehicle 1 is stopped to the pedestrian P, the illumination state of the left-side illumination unit 40L and the right-side illumination unit 40R may be changed by a method that is different than in the embodiment. For example, when the vehicle 1 has stopped short of the pedestrian crossing C, the illumination control unit 47 may change either the blinking cycle of the light emission segment to be blinked gradually or the light emission intensity of the light emission segment to be blinked gradually. The illumination control unit 47 may present information for urging the pedestrian P to cross the pedestrian crossing C to the pedestrian P while presenting information indicating that the vehicle 1 is stopped to the pedestrian P.

Subsequently, returning to FIG. 7, if determining that the pedestrian P has crossed the pedestrian crossing C (step S8: yes), the vehicle control unit 3 starts the vehicle 1 (step S9). More specifically, the vehicle control unit 3 transmits an accelerator control signal to the accelerator actuator 16 and the accelerator actuator 16 controls the accelerator device 17 on the basis of the received accelerator control signal. The vehicle 1 is thus started. The vehicle 1 may start before the pedestrian P crosses the pedestrian crossing C fully.

Figure 13A:
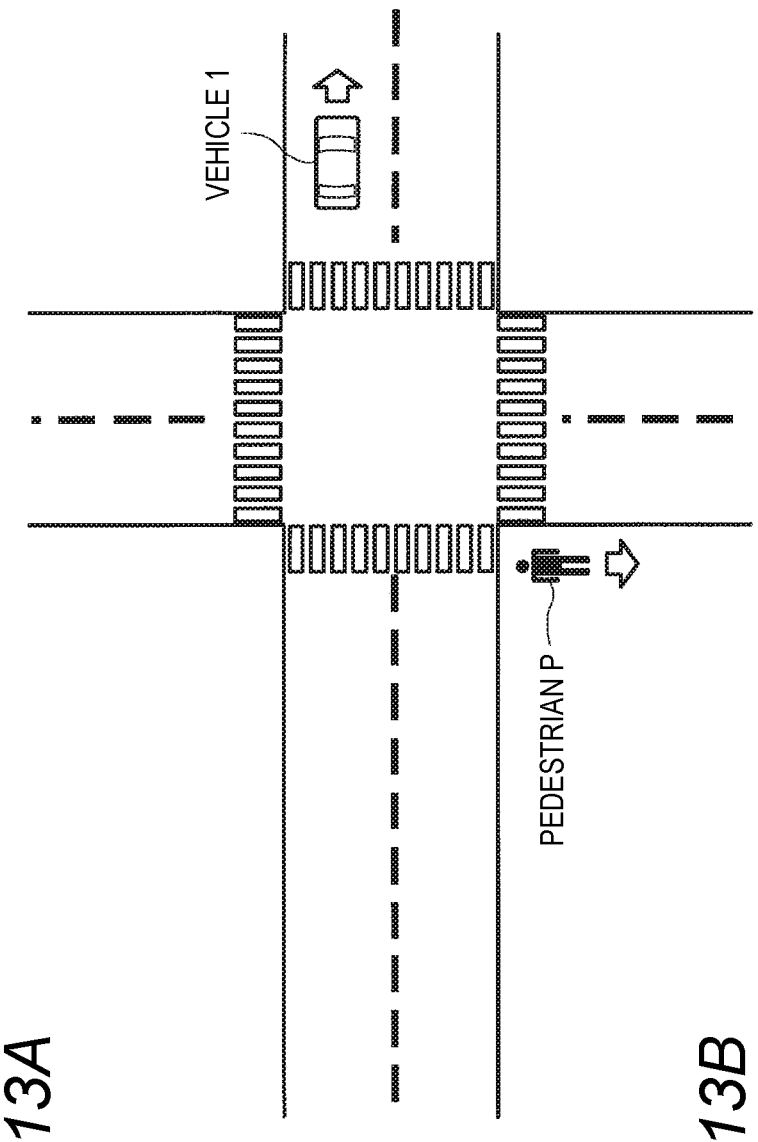
FIG. 13A is a diagram showing a situation involving the pedestrian who has crossed the pedestrian crossing and the vehicle that has passed the intersection.
Figure 13B:
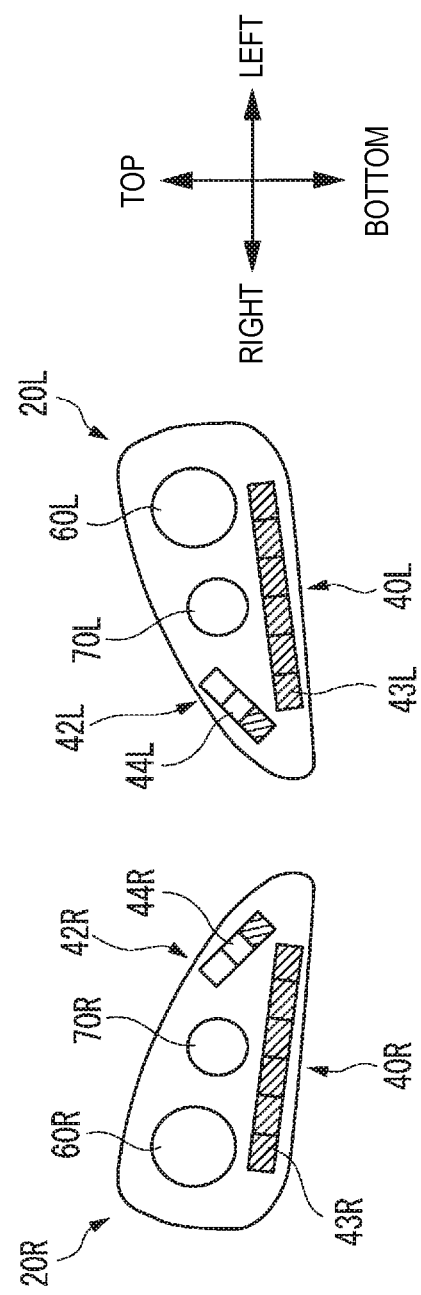
FIG. 13B shows illumination states of the left-side headlamp and the right-side headlamp in the situation shown in FIG. 13A.

Subsequently, the illumination control unit 47 causes the illumination system 4 to function as daytime running lamps (DRLs) by lighting all the light emission segments 43L and 43R in white as shown in FIG. 13B (step S10). The timing when to cause the illumination system 4 to function as daytime running lamps (DRLs) may be either after the vehicle 1's passage of the intersection or immediately after the start of the vehicle 1. The operation flow (series of steps) of the illumination system 4 is thus finished. The illumination system 4 may be caused to function as clearance lamps instead of DRLs.

In starting the vehicle 1, the illumination control unit 47 may change the illumination states of the left-side illumination unit 40L and the right-side illumination unit 40R to present, to the pedestrian P, information indicating that the vehicle 1 is going to start. For example, to present, to the pedestrian P, information indicating that the vehicle 1 is going to start, the illumination control unit 47 may blink all the left-side illumination unit 40L and the right-side illumination unit 40R a predetermined number of times (e.g., three times). The illumination control unit 47 thereafter causes the illumination system 4 to function as DRLs.

In the embodiment, the illumination control unit 47 is configured so as to change the illumination states of the left-side illumination unit 40L and the right-side illumination unit 40R when the vehicle 1 has detected a pedestrian P. Thus, the illumination system 4 can be provided which can present, to the pedestrian P, information indicating that the vehicle 1 running in the autonomous drive mode is aware of the pedestrian P. Furthermore, by seeing a change in the illumination states of the left-side illumination unit 40L and the right-side illumination unit 40R, the pedestrian P can recognize that the vehicle 1 is aware of the pedestrian P and hence can be relieved.

Having a red LED 400a, a green LED 400b, and a blue LED 400c, each of the six light emission segments 43L, the six light emission segment 43R, the three light emission segments 44L, and the three light emission segments 44R can emit red light, green light, and blue light to the outside. That is, having R, G, and B light sources, each light emission segment can emit light beams having various colors to the outside. In this manner, various kinds of illumination patterns can be produced by the left-side illumination unit 40L, the right-side illumination unit 40R, the left-side auxiliary illumination unit 42L, and the right-side auxiliary illumination unit 42R, whereby the amount of information of a V2P communication between a pedestrian P and the vehicle 1 can be increased.

Although the embodiment has been described in such a manner that the vehicle drive modes include the complete autonomous drive mode, the high-level drive assist mode, the drive assist mode, and the manual drive mode, the vehicle drive modes should not be restricted to these four modes. The classification of vehicle drive modes may be changed as appropriate according to the laws and regulations relating to the autonomous drive in each country. Likewise, the definitions of the "complete autonomous drive mode," and "high-level drive assist mode," "drive assist mode" described in the embodiment are just examples and may be changed as appropriate according to the laws and regulations relating to the autonomous drive in each country.

Although in the embodiment each of the light emission segments 43L, 43R, 44L, and 44R has a red LED 400a, a green LED 400b, a blue LED 400c, and a white LED 400d, each light emission segment may have an amber LED that is configured so as to emit amber light, a green LED, and a blue LED. In this case, it is possible to cause the illumination system 4 to function as turn signal lamps. Furthermore, each of the light emission segments 43L, 43R, 44L, and 44R may be equipped with light emission elements other than LEDs, such as semiconductor lasers. Still further, it is noted that the LEDs employed in the embodiment include OLEDs (organic light emitting diodes).

Although in the embodiment each of the left-side illumination unit 40L and the right-side illumination unit 40R has six light emission segments, the number of light emission segments is not limited to six. Furthermore, each of the left-side auxiliary illumination unit 42L and the right-side auxiliary illumination unit 42R has three light emission segment, the number of light emission segments is not limited to three. For example, the number of light emission segments can be set as appropriate according to the type of vehicle 1 equipped with the illumination system 4. Furthermore, the number of LEDs included in each light emission segment is not limited to four; for example, each light emission segment may include one or more LEDs.

Although in the embodiment the six light emission segment 43L (or six light emission segment 43L) are arranged in line in the left-right direction, the light emission segment 43L need not always be arranged in line; there are no particular limitations on their arrangement except that they should be arranged in the left-right direction.

In the embodiment, the left-side headlamp 20L may be equipped with two or more left-side illumination units 40L and the right-side headlamp 20R may be equipped with two or more right-side illumination units 40R. Furthermore, the left-side headlamp 20L may be equipped with two or more left-side auxiliary illumination units 42L and the right-side headlamp 20R may be equipped with two or more right-side auxiliary illumination unit 42R.

Although the embodiment has been described which can present, to a pedestrian P, information indicating that the vehicle 1 is aware of the pedestrian P, the invention can also be applied to an illumination system capable of presenting, to the driver of another vehicle, information indicating that the vehicle 1 is aware of the other vehicle. That is, the target object to be recognized by the vehicle 1 is not limited to a pedestrian and includes, for example, the driver of another vehicle (automobile, motorcycle, or bicycle).

Embodiment 2

A vehicle 100 according to a second embodiment of the invention will be hereinafter described with reference to the drawings. For convenience of description, descriptions of members having the same reference numerals as members already described in the first embodiment may be omitted. For convenience of description, the dimensions of each member shown in the drawings may be different from actual dimensions of the member.

Figure 14:
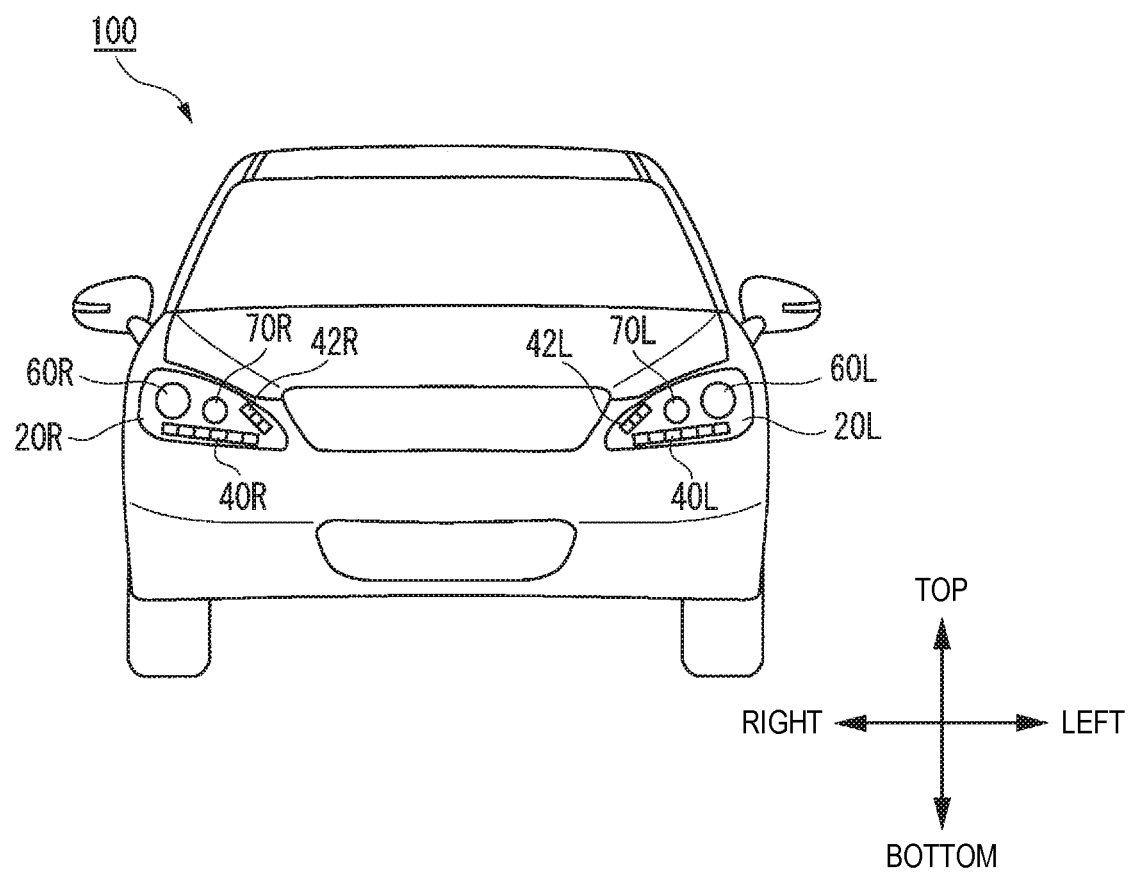
FIG. 14 is a front view of a vehicle according to a second embodiment of the invention (hereinafter referred to simply as a second embodiment).
Figure 15:
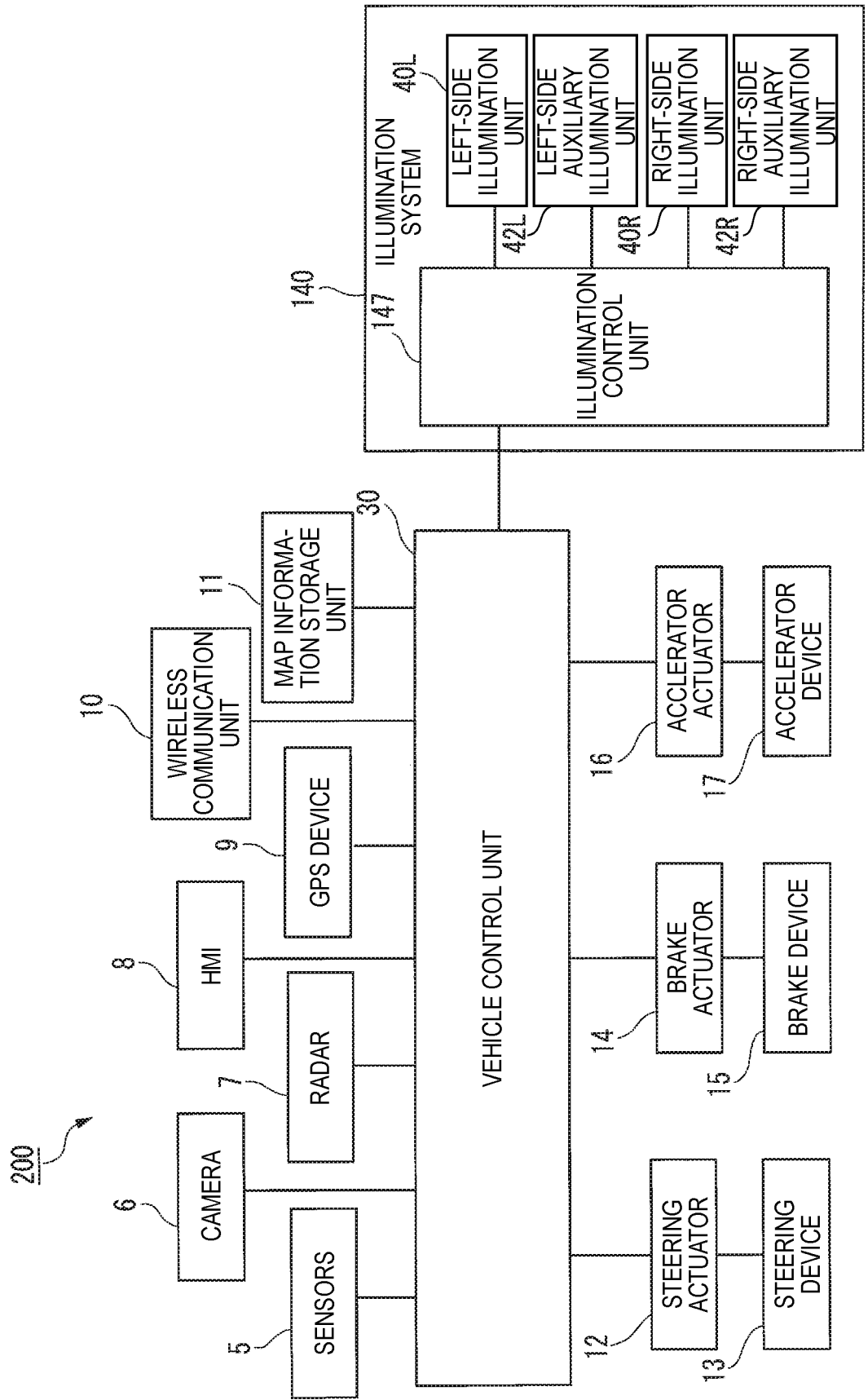
FIG. 15 is a block diagram of a vehicular system according to the second embodiment.

First, a vehicle 100 according to this embodiment and a vehicular illumination system 140 according to this embodiment (hereinafter referred to simply as a "vehicular illumination system 140") will be described below with reference to FIGS. 14 and 15. FIG. 14 is a front view of the vehicle 100. FIG. 15 is a block diagram of a vehicular system 200 which is equipped with the illumination system 140. The vehicle 100 is a vehicle (automobile) capable of running in an autonomous drive mode and is equipped with the illumination system 140 (see FIG. 15). The illumination system 140 is equipped with a left-side illumination unit 40L, a left-side auxiliary illumination unit 42L, a right-side illumination unit 40R, a right-side auxiliary illumination unit 42R, and an illumination control unit 147. Each of the left-side illumination unit 40L, the left-side auxiliary illumination unit 42L, the right-side illumination unit 40R, and the right-side auxiliary illumination unit 42R is a lamp for assisting a communication between a target object such as a pedestrian or another vehicle and the vehicle 100. Furthermore, at least one of the left-side illumination unit 40L, the left-side auxiliary illumination unit 42L, the right-side illumination unit 40R, and the right-side auxiliary illumination unit 42R is configured so as to emit light in an illumination pattern corresponding to a password of encrypted data which is transmitted wirelessly from the vehicle 100. In the embodiment, the left-side illumination unit 40L functions as an illumination unit that emits light beams in an illumination pattern corresponding to a password of encrypted data.

The left-side headlamp 20L has a low-beam lamp 60L which is configured so as to emit a low beam toward the front side of the vehicle 100 and a high-beam lamp 70L which is configured so as to emit a high beam toward the front side of the vehicle 1. The left-side headlamp 20R has a low-beam lamp 60R which is configured so as to emit a low beam toward the front side of the vehicle 100 and a high-beam lamp 70R which is configured so as to emit a high beam toward the front side of the vehicle 1.

Next, the vehicular system 200 of the vehicle 100 will be described with reference to FIG. 15. As shown in FIG. 15, the vehicular system 200 is equipped with a vehicle control unit 30, the illumination system 140, sensors 5, a camera 6, a radar 7, an HMI 8, a GPS device 9, a wireless communication unit 10, and a map information storage unit 11. The vehicular system 200 is further equipped with a steering actuator 12, a steering device 13, a brake actuator 14, a brake device 15, an accelerator actuator 16, and an accelerator device 17.

The vehicle control unit 30 is configured so as to control running of the vehicle 100. The vehicle control unit 3 is configured by at least one electronic control unit (ECU), which includes a computing system (e.g., microcontroller) including one or more processors and one or more memories and an electronic circuit consisting of active elements such as transistors and passive elements. For example, the processor(s) is a CPU, an MPU, a GPU, and/or a TPU. The CPU may consist of plural CPU cores. The GPU may consist of plural GPU cores. The memory or memories include a ROM and a RAM. The ROM may be stored with vehicle control programs, which may include, for example, an artificial intelligence (AI) program for autonomous driving. The AI program is a program that was constructed by machine learning with or without a teacher using a neural network, such as deep learning. The RAM may be temporarily stored with the vehicle control programs, vehicle control data, and/or surrounding environment information indicating an environment surrounding the vehicle. The processor(s) may be configured so as to develop, on the RAM, a designated program among the various vehicle control programs stored in the ROM and perform any of various kinds of processing cooperating with the RAM. The computing system may be configured by an ASIC, an FPGA, or the like.

As described above, the illumination system 140 is equipped with the illumination control unit 147, the left-side illumination unit 40L, the left-side auxiliary illumination unit 42L, the right-side illumination unit 40R, and the right-side auxiliary illumination unit 42R. The illumination control unit 147 is configured so as to change the illumination state (illumination color, illumination intensity, blinking cycle, illumination location, illumination area, etc.) of each of the left-side illumination unit 40L and the right-side illumination unit 40R. Furthermore, the illumination control unit 147 is configured so as to change the illumination state (illumination color, illumination intensity, blinking cycle, illumination location, illumination area, etc.) of each of the left-side auxiliary illumination unit 42L and the right-side auxiliary illumination unit 42R.

The illumination control unit 147 is configured by an electronic control unit (ECU) and electrically connected to a power source (not shown). The electronic control unit includes a computing system (e.g., microcontroller) including one or more processors and one or more memories and an electronic circuit (e.g., drive circuits such as LED drivers) consisting of active elements such as transistors and passive elements. For example, the processor(s) is a CPU, MPU, GPU, and/or a TPU. The memory or memories include a ROM and a RAM. The computing system may be configured by an ASIC, an FPGA, or the like. Although in this embodiment the vehicle control unit 30 and the illumination control unit 147 are separate units, they may be implemented as a single unit, that is, a single electronic control unit. As for the specific configurations of the left-side illumination unit 40L and the right-side illumination unit 40R, refer to FIGS. 3 and 4. The illumination control unit 147 is configured so as to drive-control the left-side illumination unit 40L, the right-side illumination unit 40R, the left-side auxiliary illumination unit 42L, and the right-side auxiliary illumination unit 42R in the same manner as the illumination control unit 47 employed in the first embodiment.

More specifically, as shown in FIGS. 3 and 4, the illumination control unit 147 is electrically connected to LEDs 400 of each light emission segment 43L by an interconnection pattern formed on a circuit board 46L. The illumination control unit 47 can change the illumination state (e.g., illumination color, illumination intensity, blinking cycle, etc.) of each light emission segment 43L by performing lighting controls individually on the LEDs 400 belonging to the light emission segment 43L (i.e., by supplying electrical signals to the respective LEDs 400). Furthermore, the illumination control unit 147 can change the illumination state of the left-side illumination unit 40L by changing the illumination states of its respective light emission segments 43L.

The illumination control unit 147 is electrically connected to the LEDs 400 of each light emission segment 43R by an interconnection pattern formed on a circuit board. The illumination control unit 147 can change the illumination state (e.g., illumination color, illumination intensity, blinking cycle, etc.) of each light emission segment 43R by performing lighting controls individually on the LEDs 400 belonging to the light emission segment 43R (i.e., by supplying electrical signals to the respective LEDs 400). Furthermore, the illumination control unit 147 can change the illumination state of the right-side illumination unit 40R by changing the illumination states of its respective light emission segments 43R.

Figure 16:
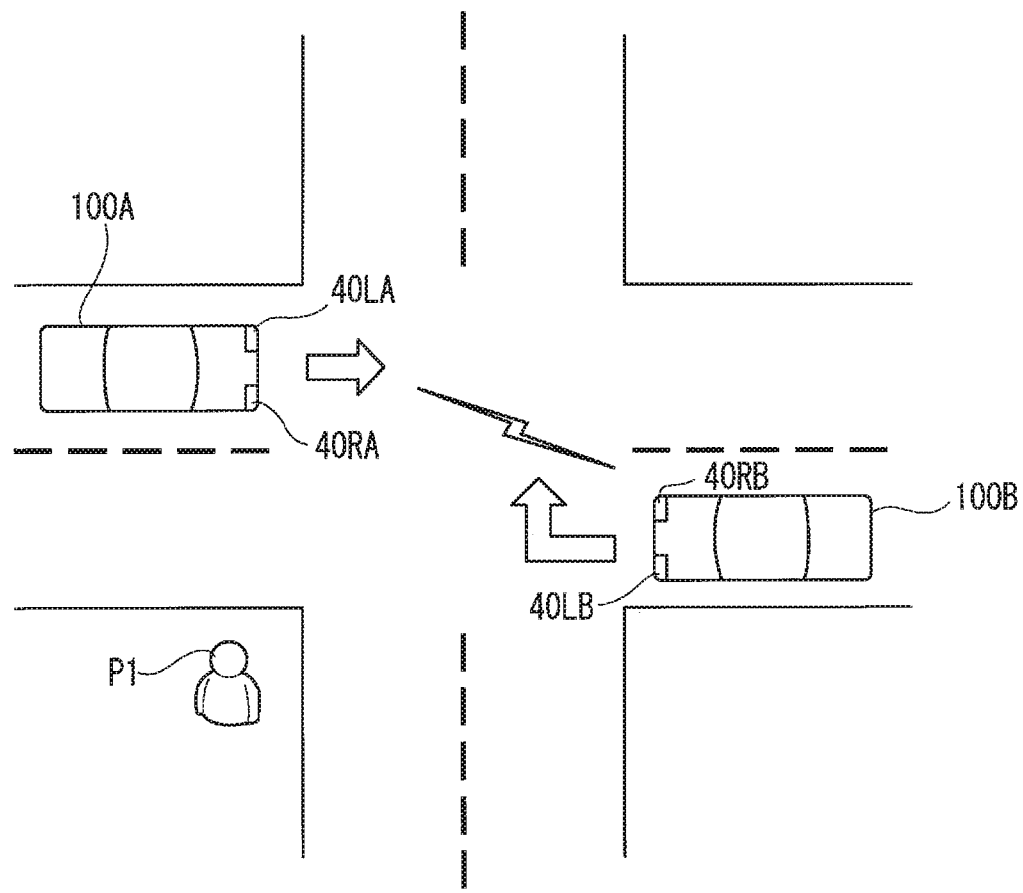
FIG. 16 is a diagram showing a transmission-side vehicle and a reception-side vehicle.
Figure 17:
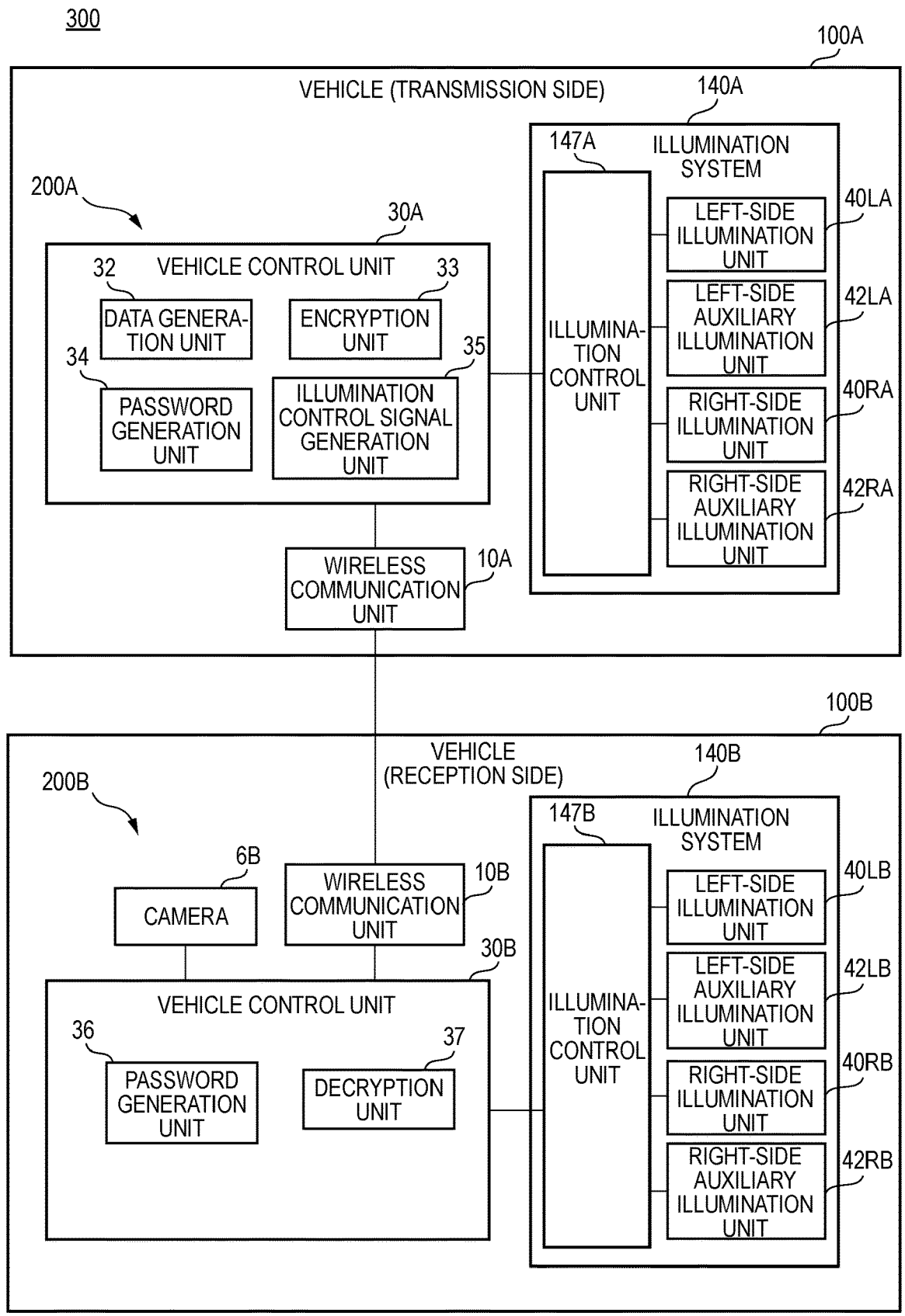
FIG. 17 is a block diagram of a V2V communication system according to the second embodiment which is equipped with the transmission-side vehicle and the reception-side vehicle.
Figure 18:
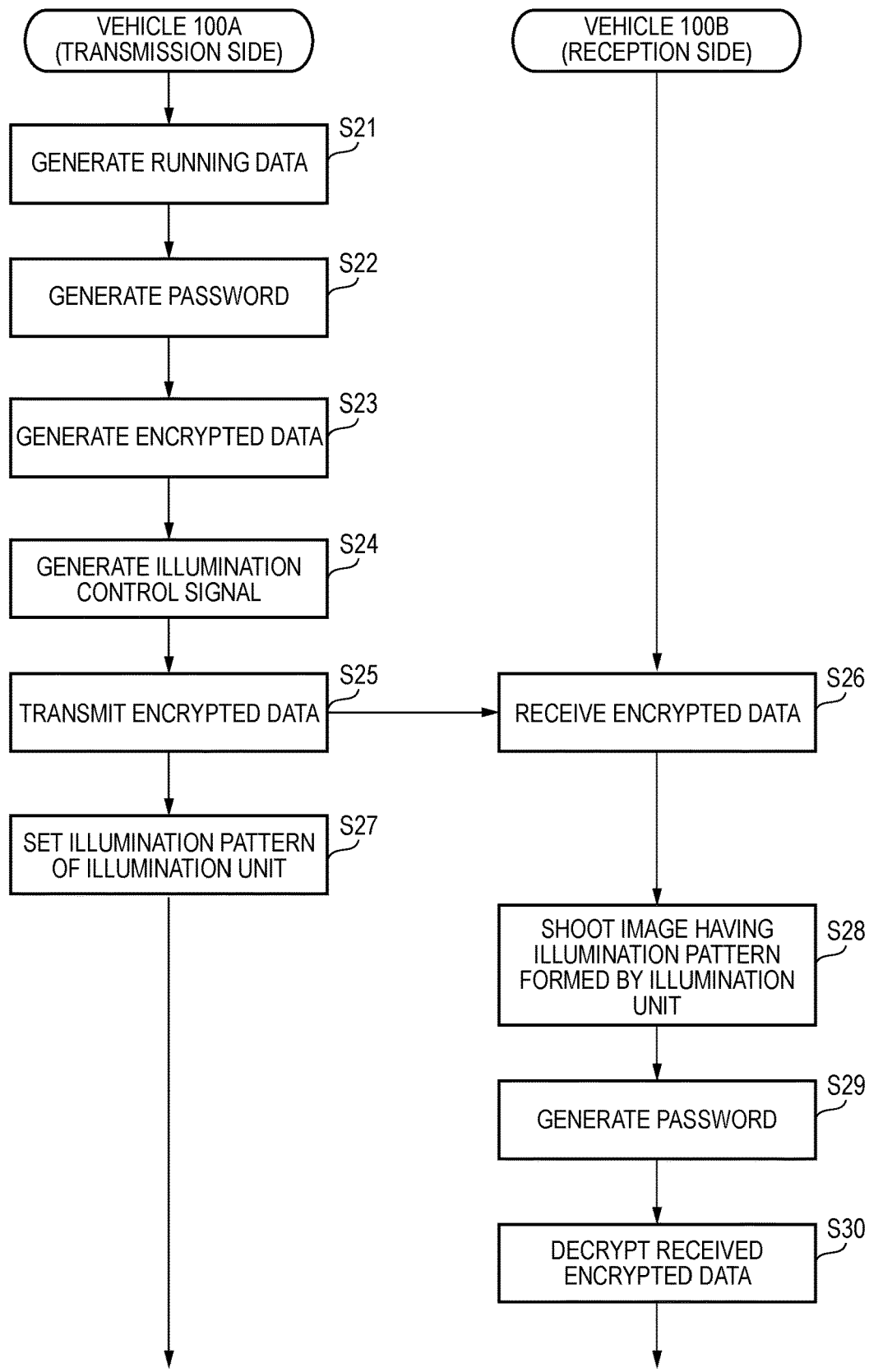
FIG. 18 is a sequence diagram for description of an example operation of the V2V communication system according to the second embodiment.

Next, a V2V communication system 300 (data communication system) according to the embodiment will be described with reference to FIGS. 16-18. FIG. 16 shows a transmission-side vehicle 100A (hereinafter referred to simply as a vehicle 100A) and a reception-side vehicle 100B (hereinafter referred to simply as a vehicle 100B). FIG. 17 is a block diagram of the V2V communication system 300 which is equipped with the vehicle 100A and the vehicle 100B. FIG. 18 is a sequence diagram for description of an example operation of the V2V communication system 300. In this embodiment, whereas the vehicle 100A is a vehicle that transmits encrypted running data (a kind of transmission data), the vehicle 100B functions as a data communication device that receives the encrypted running data. It is assumed that a vehicular system 200A of the vehicle 100A and a vehicular system 200B of the vehicle 100B have the same configuration as the vehicular system 200 of the vehicle 100 shown in FIG. 15. For convenience of description, only part of the constituent elements of each of the vehicles 100A and 100B are shown in FIG. 17. That is, it is noted that for convenience of description such constituent elements as sensors, a radar, and an HMI are omitted.

A wireless communication unit 10A (first wireless communication unit) and a wireless communication unit 10B (second wireless communication unit) have the same configuration as the wireless communication unit 10 shown in FIG. 15. Vehicle control units 30A and 30B have the same configuration as the vehicle control unit 30 shown in FIG. 15. Vehicular illumination systems 140A and 140B (hereinafter referred to simply as illumination systems 140A and 140B) have the same configuration as the illumination system 140 shown in FIG. 15. In particular, an illumination control unit 147A and an illumination control unit 147B have the same configuration as the illumination control unit 147 shown in FIG. 15. A left-side illumination unit 40LA and a left-side illumination unit 40LB have the same configuration as the left-side illumination unit 40L shown in FIG. 15. That is, as shown in FIGS. 3 and 4, the left-side illumination unit 40LA has six light emission segments 43L which are arranged in the left-right direction. Likewise, a right-side illumination unit 40RA has six light emission segments 43R which are arranged in the left-right direction. The right-side illumination unit 40RA and a right-side illumination unit 40RB have the same configuration as the right-side illumination unit 40R shown in FIG. 15. A left-side auxiliary illumination unit 42LA and a left-side auxiliary illumination unit 42LB have the same configuration as the left-side auxiliary illumination unit 42L shown in FIG. 15, and a right-side auxiliary illumination unit 42RA and a right-side auxiliary illumination unit 42RB have the same configuration as the right-side auxiliary illumination unit 42R shown in FIG. 15. Although the V2V communication system 300 shown in FIG. 17 includes the two vehicles 100A and 100B, there are no particular limitations on the number of vehicles.

The vehicle control unit 30A functions as a data generation unit 32, an encryption unit 33, a password generation unit 34 (first password generation unit), and an illumination control signal generation unit 35. On the other hand, the vehicle control unit 30B functions as a password generation unit 36 (second password generation unit) and a decryption unit 37. It is noted that where the vehicle 100B transmits encrypted running data whereas the vehicle 100A receives the encrypted running data, the vehicle control unit 30A functions as the password generation unit 36 and the decryption unit 37 whereas the vehicle control unit 30B functions as the data generation unit 32, the encryption unit 33, the password generation unit 34, and the illumination control signal generation unit 35.

Next, an example operation of the V2V communication system will be described with reference to FIG. 18. As shown in FIG. 18, at step S21, the data generation unit 32 generates running data. Then the password generation unit 34 generates a random password to be used for encrypting the running data generated by the data generation unit 32 (step S22). It is assumed here that, for example, the password generation unit 34 generates a password "012301" using numerals "0" to "3." Then the encryption unit 33 generates encrypted data by encrypting the running data using the password ("012301") generated by the password generation unit 34 (step S23).

Subsequently, the illumination control signal generation unit 35 generates an illumination control signal on the basis of the password ("012301") generated by the password generation unit 34 (step S24). For example, the illumination control signal generation unit 35 may generate an illumination control signal from the generated password by referring to a conversion table (Table 1) showing a relationship between the numeral of a password and the illumination color of a light emission segment 43L (see FIG. 3). The conversion table may be stored in a ROM or the like. The corresponding relationship between the numeral of a password and the illumination color of a light emission segment 43L is just an example.

TABLE 1

Conversion table

| Numeral of password | Illumination color of light emission segment |
|---|---|
| 0 | R (red) |
| 1 | G (green) |
| 2 | B (blue) |
| 3 | W (white) |

When the password is "012301," the illumination control signal generation unit 35 generates an illumination control signal "RGBWRG." The illumination control signal is a signal for controlling the illumination colors of the six light emission segments 43L, arranged in the left-right direction, of the left-side illumination unit 40LA. When the illumination control signal is "RGBWRG," the colors of the respective light emission segments 43L are controlled in the following manner.

The illumination color of the left end light emission segments 43L (in the following, for convenience of description, referred to as a light emission segments 43L 1) is set to red (R).

The illumination color of the second light emission segments 43L from the left end (in the following, referred to as a light emission segments 43L2) is set to green (G).

The illumination color of the third light emission segments 43L from the left end (in the following, referred to as a light emission segments 43L3) is set to blue (B).

The illumination color of the fourth light emission segments 43L from the left end (in the following, referred to as a light emission segments 43L4) is set to white (W).

The illumination color of the fifth light emission segments 43L from the left end (in the following, referred to as a light emission segments 43L5) is set to red (R).

The illumination color of the sixth light emission segments 43L from the left end (in other words, right end light emission segments 43L; in the following, referred to as a light emission segments 43L6) is set to green (G).

Then, at step S25, the wireless communication unit 10A wirelessly transmits the encrypted data to the wireless communication unit 10B of the vehicle 10B. Then the illumination control unit 147A receives the illumination control signal generated by the illumination control signal generation unit 35 and sets an illumination pattern of the left-side illumination unit 40LA on the basis of the illumination control signal (step S27). More specifically, the illumination control unit 147A sets the illumination colors of the light emission segments 43L1-43L6 of the left-side illumination unit 40LA to, red, green, blue, white, red, and green, respectively, on the basis of the illumination control signal "RGBWRG."

Subsequently, after the wireless communication unit 10B wirelessly receives the encrypted data at step S26, the camera 6B shoots an image having an illumination pattern formed by the left-side illumination unit 40LA of the vehicle 100A and thereby acquires a shot image (step S28). In particular, the camera 6B shoots the six light emission segments 43L1-43L6 that are emitting red light, green light, blue light, white light, red light, and green light, respectively and thereby acquires a shot image of the light emission segments 43L1-43L6.

Subsequently, the password generation unit 36 generates a password on the basis of the shot image acquired by the camera 6B (step S29). More specifically, the password generation unit 36 determines illumination colors of the light emission segments 43L1-43L6 on the basis of the acquired shot image and a prescribed image recognition algorithm. Then the password generation unit 36 generates a password "012301" from the determined illumination colors (R, G, B, W, R, and G) of the light emission segments 43L1-43L6 by referring to a conversion table (Table 1) indicating the relationship between the numeral of a password and the illumination color of a light emission segment 43L. The conversion table may be stored in a ROM or the like of the vehicle control unit 30B. The conversion table stored in the vehicle control unit 30A may be the same as that stored in the vehicle control unit 30B.

After the execution of step S29, the decryption unit 37 decrypts the received encrypted data using the password "012301" generated by the password generation unit 36 (step S30). In the above-described manner, the vehicle 100B can acquire running data of the vehicle 100A with necessary communication security ensured. For example, when receiving, from the vehicle 100A, running data indicating that the vehicle 100A will go straightly at an intersection, the vehicle 100B waits without making a right turn at the intersection until the vehicle 100A passes the intersection. The series of steps is completed in the above-described manner.

In the embodiment, an illumination control signal is generated on the basis of a password of encrypted data to be transmitted wirelessly and illumination colors (illumination pattern) of the light emission segments 43L1-43L6 of the left-side illumination unit 40LA are set on the basis of the illumination control signal. On the other hand, in the vehicle 100A, an image having the illumination pattern of the left-side illumination unit 40LA is obtained and the password is generated on the basis of the illumination pattern. Furthermore, the encrypted data transmitted wirelessly is decrypted using the generated password. The communication security of a V2V communication can be increased in this manner, that is, by using an illumination pattern of the left-side illumination unit 40LA (more specifically, by using illumination colors of the light emission segments 43L1-43L6).

In the embodiment, since each of the plural light emission segments 43L is equipped with the four light sources that emits light beams of different colors (R, G, and B light sources plus white light source), the left-side illumination unit 40LA can emit light in various colors. In this respect, each light emission segment 43L can emit light in four or more colors. For example, light having a color other than red, green, blue, or white can be produced by combining red light, green light, and blue light. Since the information entropy of a password of encrypted data can be increased in this manner, the communication security of a V2V communication can be increased.

In the embodiment, $4^6$ (4,096) kinds of passwords can be generated because each of the six light emission segments 43L of the left-side illumination unit 40LA has the four kinds of illumination colors. On the other hand, if the illumination color of an unlit light emission segment 43L is regarded as black, $5^6$ (15,625) kinds of passwords can be generated by using the five kinds of illumination colors (including black) of each of the six light emission segments 43L of the left-side illumination unit 40LA. That is, a password can be expressed by quinary notation. In this case, the following is an example corresponding relationship between the numeral of a password and the illumination color of a light emission segment 43L:

TABLE 2

Conversion table

| Numeral of password | Illumination color of light emission segment |
|---|---|
| 0 | R (red) |
| 1 | G (green) |
| 2 | B (blue) |
| 3 | W (white) |
| 4 | Bla (black), unlit state |

Although in the embodiment a password is generated using illumination colors of the six light emission segments 43L, a password may be generated by binary notation using a lit state and an unlit state of the six light emission segments 43L. For example, the lit state of a light emission segment 43L is set as "1" and the unlit state of a light emission segment 43L is set as "0." In this case, when a password is "000111," the illumination control unit 147 turns off the light emission segments 43L1-43L3 and lights the light emission segments 43L4-43L6.

Although in the embodiment only the left-side illumination unit 40LA generates an illumination pattern corresponding to a password to be used for encrypting running data, an illumination pattern corresponding to a password may be generated by only the right-side illumination unit 40RA or both of the left-side illumination unit 40LA and the right-side illumination unit 40RA. It is possible to generate $M^N$ kinds of passwords when the number of light emission segments 43L of the left-side illumination unit 40LA is equal to N (N>1) and each light emission segment 43L emits light in M kinds of illumination colors (M>1).

In the embodiment, the vehicle 100A transmits running data to the vehicle 100B. There are no particular limitations on the kind of data to be transmitted from the vehicle 100A. An alternative operation is possible that the vehicle 100B transmits running data and the vehicle 100A receives it. In this case, whereas the vehicle 100B executes steps S21 to S27 shown in FIG. 18, the vehicle 100A executes steps S26 to S30 shown in the same figure. The use of illumination colors of the six light emission segment 43L of the left-side illumination unit 40LB makes it possible to increase the communication security of a V2V communication.

Although the embodiment has been directed to increase of the communication security of the V2V communication 300, the invention is not limited to this. For example, the invention makes it possible to increase the communication security in a V2I communication system for a communication between the vehicle 100A and a traffic infrastructure facility (e.g., traffic lights installed at an intersection or a toll gate installed for an express way).

For example, a traffic infrastructure facility may function as a data communication device for receiving encrypted data in place of the vehicle 100B. In this case, the traffic infrastructure facility is equipped with a wireless communication unit (second wireless communication unit) which is configured so as to receive encrypted data wirelessly, a camera (imaging unit) which is configured so as to acquire a shot image by shooting an image having an illumination pattern formed by the left-side illumination unit 40LA of the vehicle 100A, a password generation unit (second password generation unit) for generating a password on the basis of the shot image, and a decryption unit which is configured so as to decrypt the encrypted data using the password. In this configuration, the password generation unit and the decryption unit may be implemented as a memory and a processor that are provided in the traffic infrastructure facility.

Furthermore, the invention makes it possible to increase the communication security of a V2P communication system for a communication between the vehicle 100A and a pedestrian P1 (more specifically, a portable electronic device carried by the pedestrian P1). The portable electronic device is a smartphone, a tablet terminal, a notebook personal computer, or a wearable device.

For example, the portable electronic device may function as a data communication device for receiving encrypted data in place of the vehicle 100B shown in FIG. 17. In this case, the portable electronic device is equipped with a wireless communication unit (second wireless communication unit) which is configured so as to receive encrypted data wirelessly, a camera (imaging unit) which is configured so as to acquire a shot image by shooting an image having an illumination pattern formed by the left-side illumination unit 40LA of the vehicle 100A, a password generation unit (second password generation unit) for generating a password on the basis of the shot image, and a decryption unit which is configured so as to decrypt the encrypted data using the password. In this configuration, the password generation unit and the decryption unit may be implemented as a memory and a processor that are provided in the portable electronic device.

Although in the embodiment the left-side illumination unit 40LA generates an illumination pattern indicating a password to be used for encrypting running data and the password generation unit 36 acquires the password on the basis of a shot image acquired by the camera 6B, the invention is not limited to this configuration. For example, an alternative configuration is possible in which the left-side illumination unit 40LA generates an illumination pattern indicating running data and the vehicle control unit 30B acquires the running data on the basis of a shot image acquired by the camera 6B.

In this case, the vehicle control unit 30A shown in FIG. 17 functions as the data generation unit 32 for generating transmission data and an illumination control signal generation unit which is configured so as to generate an illumination control signal on the basis of the transmission data generated by the data generation unit 32. The vehicle control unit 30B functions as a data generation unit for generating the transmission data on the basis of a shot image acquired by the camera 6B. For example, where transmission data is "012301," the illumination control signal generation unit may generate an illumination control signal "RGBWRG" from the transmission data by referring to a conversion table (Table 3) indicating a relationship between the numeral of transmission data and the illumination color of a light emission segment 43L.

TABLE 3

Conversion table

| Numeral of transmission data | Illumination color of light emission segment |
|---|---|
| 0 | R (red) |
| 1 | G (green) |
| 2 | B (blue) |
| 3 | W (white) |

The illumination control unit 147A sets the illumination colors of the light emission segments 43L1-43L6 of the left-side illumination unit 40LA to red, green, blue, white, red, and green, respectively, on the basis of the illumination control signal "RGBWRG." After an image having the illumination pattern of the left-side illumination unit 40LA is acquired by the camera 6B, the data generation unit of the vehicle control unit 30B generates the transmission data on the basis of a shot image acquired by the camera 6B. More specifically, the data generation unit determines the illumination colors (R, G, B, W, R, and G) of the light emission segments 43L1-43L6 that are displayed in the shot image and generates the transmission data "012301" from the determined illumination colors (R, G, B, W, R, and G) of the light emission segments 43L1-43L6.

As described above, a V2V communication can be realized by using illumination colors of the six light emission segments 43L of the left-side illumination unit 40LA. Where a traffic infrastructure facility communicates with the vehicle 100A in place of the vehicle 100B, a V2I communication can be realized by using illumination colors of the six light emission segments 43L of the left-side illumination unit 40LA. Furthermore, where a portable electronic device carried by a pedestrian P1 communicates with the vehicle 100A in place of the vehicle 100B, a V2P communication can be realized by using illumination colors of the six light emission segments 43L of the left-side illumination unit 40LA.

Although in the embodiment each of the left-side illumination unit 40L and the right-side illumination unit 40R has six light emission segments, the number of light emission segments is not limited to six. For example, the number of light emission segments can be set as appropriate according to the vehicle type of the vehicle 100 equipped with the illumination system 140. Furthermore, the number of light emission segments included in each light emission segment is not limited to four; for example, each light emission segment may include one or more LEDs.

Although the first and second embodiments have been described above, it goes without saying that the technical scope of the invention should not be construed restrictively by the descriptions of the first and second embodiments. The first and second embodiments are just examples and it would be understood by those skilled in the art that the embodiments can be modified in various manners within the confines of the scope of the claimed inventions. The technical scope of the invention should be determined by the scope of the invention as described in the claims and their equivalents.

The present application incorporates, where appropriate, the disclosure of Japanese Patent Application No. 2016-241090 filed on Dec. 13, 2016 and the disclosure of Japanese Patent Application No. 2016-241556 filed on Dec. 13, 2016.

The invention claimed is:

1. A vehicular illumination system provided in a vehicle that is capable of running in an autonomous drive mode, the vehicular illumination system comprising:
    a light source which is configured to emit light toward an outside of the vehicle and disposed to be seen from a front side of the vehicle;
    an auxiliary light source which is configured to emit light toward the outside of the vehicle and disposed to be seen from the front side of the vehicle; and
    a processor which is configured to change an illumination state of each of the light source and the auxiliary light source,
    wherein:
        the processor is configured to change the illumination state of the light source when the vehicle has detected a target object;
        the processor is configured to change the illumination state of the auxiliary light source according to a speed of the vehicle;
        the light source comprises a plurality of first light emission segments;
        the auxiliary light source comprises a plurality of second light emission segments;
        the processor is configured to change an illumination state of each of the first light emission segments and the second light emission segments; and
        the processor is configured to change a number of second light emission segments to be lit among the second light emission segments according to the speed of the vehicle.

2. The vehicular illumination system according to claim 1, wherein the processor is configured to change the illumination state of the light source according to a relative positional relationship between the vehicle and the target object.

3. The vehicular illumination system according to claim 2, wherein the processor is configured to sequentially change a first light emission segment to be lit or turned off among the first light emission segments according to the relative positional relationship between the vehicle and the target object.

4. The vehicular illumination system according to claim 1, wherein the processor is configured to change the illumination state of the light source when the vehicle has stopped after detecting the target object.

5. The vehicular illumination system according to claim 4, wherein the processor is configured to sequentially change a first light emission segment to be lit or turned off among the plural first light emission segments in a movement direction of the target object when the vehicle has stopped after detecting the target object.

6. The vehicular illumination system according to claim 1, wherein the processor is configured to decrease the number of second light emission segments to be lit among the second light emission segments as the speed of the vehicle decreases.

7. The vehicular illumination system according to claim 1, wherein:
    each of the first light emission segments and the second light emission segments comprises:
        a first light emission element that is configured to emit light of a first color;
        a second light emission element that is configured to emit light of a second color; and
        a third light emission element that is configured to emit light of a third color;
    the first color, the second color, and the third color are different from each other; and
    the processor is configured to individually control lighting of the first light emission element, the second light emission element, and the third light emission element.

8. The vehicular illumination system according to claim 7, wherein:
    the first light emission element is configured to emit red light;
    the second light emission element is configured to emit green light; and
    the third light emission element is configured to emit blue light.

9. A vehicular system comprising:
    an electronic control unit (ECU) comprising a microcontroller, the ECU being configured to:
        control a speed of a vehicle;
        detect a target object; and
        acquire position information of the target object; and
    a vehicular illumination system,
    wherein the vehicular illumination system comprises:
        a light source which is configured to emit light toward an outside of the vehicle and disposed to be seen from a front side of the vehicle;
        an auxiliary light source which is configured to emit light toward the outside of the vehicle and disposed to be seen from the front side of the vehicle; and a processor which is configured to change an illumination state of each of the light source and the auxiliary light source, and wherein:
the processor is configured to change the illumination state of the light source when the vehicle has detected the target object;
the processor is configured to change the illumination state of the auxiliary light source according to a speed of the vehicle;
the light source comprises a plurality of first light emission segments;
the auxiliary light source comprises a plurality of second light emission segments;
the processor is configured to change an illumination state of each of the first light emission segments and the second light emission segments; and
the processor is configured to change a number of second light emission segments to be lit among the second light emission segments according to the speed of the vehicle.

10. A vehicle capable of running in an autonomous drive mode, the vehicle comprising a vehicular system that comprises:
an electronic control unit (ECU) comprising a microcontroller, the ECU being configured to control a speed of a vehicle, detect a target object, and acquire position information of the target object; and
a vehicular illumination system,
wherein the vehicular illumination system comprises:
a light source which is configured to emit light toward an outside of the vehicle and disposed to be seen from a front side of the vehicle;
an auxiliary light source which is configured to emit light toward the outside of the vehicle and disposed to be seen from the front side of the vehicle; and
a processor which is configured to change an illumination state of each of the light source and the auxiliary light source, and wherein:
the processor is configured to change the illumination state of the light source when the vehicle has detected the target object;
the processor is configured to change the illumination state of the auxiliary light source according to a speed of the vehicle;
the light source comprises a plurality of first light emission segments;
the auxiliary light source comprises a plurality of second light emission segments;
the processor is configured to change an illumination state of each of the first light emission segments and the second light emission segments; and
the processor is configured to change a number of second light emission segments to be lit among the second light emission segments according to the speed of the vehicle.

11. A vehicle that is capable of running in an autonomous drive mode, the vehicle comprising:
an electronic control unit (ECU) comprising a microcontroller, the ECU being configured to:
generate data;
generate a password for encrypting the data;
generate encrypted data by encrypting the data using the password; and
generate an illumination control signal based on the password;
a first wireless transceiver configured to transmit the encrypted data wirelessly;
a light source configured to emit light toward an outside of the vehicle, wherein the light source comprises a plurality of light emission segments; and
a processor configured to set an illumination pattern of the light source based on the illumination control signal.

12. The vehicle according to claim 11, wherein the processor is configured to set an illumination color of each of the light emission segments based on the illumination control signal.

13. The vehicle according to claim 11, wherein
each of the light emission segments comprises:
a first light emission element that is configured to emit light of a first color;
a second light emission element that is configured to emit light of a second color; and
a third light emission element that is configured to emit light of a third color,
the first color, the second color, and the third color are different from each other, and
the processor is configured to individually control lighting of the first light emission element, the second light emission element, and the third light emission element.

14. The vehicular illumination system according to claim 13, wherein:
the first light emission element is configured to emit red light;
the second light emission element is configured to emit green light; and
the third light emission element is configured to emit blue light.

15. A data communication device comprising:
a wireless transceiver configured to receive encrypted data wirelessly;
a camera configured to acquire a shot image by shooting an image of an illumination pattern formed by a light source of another vehicle;
a processor that generates a password based on the acquired shot image and decrypts the encrypted data using the generated password.

16. A data communication system comprising:
a vehicle that is capable of running in an autonomous drive mode; and
a data communication device,
wherein the vehicle comprises: an electronic control unit (ECU) comprising a microcontroller;
a first wireless transceiver; a light source; and a first processor,
wherein the ECU is configured to generate data, generate a password to be used for encrypting the data, generate encrypted data by encrypting the data using the password, and
generate an illumination control signal based on the password,
wherein the first wireless transceiver is configured to transmit the encrypted data wirelessly,
wherein the light source is configured to emit light toward an outside of the vehicle and comprises a plurality of light emission segments, and
wherein the first processor is configured to set an illumination pattern of the illumination unit light source based on the illumination control signal; and
wherein the data communication device comprises:
a second wireless transceiver configured to receive the encrypted data wirelessly;

a camera configured to acquire a shot image by shooting an image of the illumination pattern formed by the light source of the vehicle; and a second processor that generates the password based on the acquired shot image decrypt the encrypted data using the generated password.

17. A vehicle that is capable of running in an autonomous drive mode, the vehicle comprising: an electronic control unit (ECU) comprising a microcontroller; a processor; and a light source, wherein the ECU is configured to generate data and generate an illumination control signal based on the data;

wherein the light source is configured to emit light toward an outside of the vehicle and comprises a plurality of light emission segments; and wherein the processor is configured to set an illumination pattern of the light source based on the illumination control signal.

* * * * *